United States Patent
Turner et al.

(10) Patent No.: US 8,582,425 B1
(45) Date of Patent: Nov. 12, 2013

(54) SYSTEMS AND METHODS FOR CANCELLING CROSSTALK IN SATELLITE ACCESS DEVICES

(75) Inventors: Michael D. Turner, Huntsville, AL (US); Arlynn Wayne Wilson, Huntsville, AL (US); Fred Chu, Madison, AL (US)

(73) Assignee: ADTRAN, Inc., Huntsville, AL (US)

(*) Notice: Subject to any disclaimer, the term of this patent is extended or adjusted under 35 U.S.C. 154(b) by 217 days.

(21) Appl. No.: 13/016,680

(22) Filed: Jan. 28, 2011

Related U.S. Application Data

(60) Provisional application No. 61/387,709, filed on Sep. 29, 2010.

(51) Int. Cl.
*G01R 31/08* (2006.01)

(52) U.S. Cl.
USPC .......................................... 370/222

(58) Field of Classification Search
USPC ......... 370/203, 204–215, 229–240, 310–394, 370/395.1, 395.3, 395.4, 395.41, 395.42, 370/395.5, 395.52, 395.53, 412–421, 370/431–529
See application file for complete search history.

(56) References Cited

U.S. PATENT DOCUMENTS

| 2005/0152385 | A1* | 7/2005 | Cioffi | 370/420 |
| 2009/0092242 | A1 | 4/2009 | Cooke et al. | |
| 2010/0074312 | A1 | 3/2010 | Cioffi et al. | |
| 2011/0110409 | A1* | 5/2011 | Sands et al. | 375/222 |

OTHER PUBLICATIONS

International Telecommunication Union, ITU-T G.993.2, Series G: Transmission Systems and Media, Digital System and Networks, "Very High Speed Digital Subscriber Line Transceivers2 (VDSL2)," pp. 80-82, 2006.

International Telecommunication Union, ITU-T G.993.5, Series G: Transmission Systems and Media, Digital System and Networks, "Self-FEXT cancellation (vectoring) for use with VDSL2 transceivers," 2010.

\* cited by examiner

*Primary Examiner* — Jung-Jen Liu
(74) *Attorney, Agent, or Firm* — Maynard Cooper & Gale, P.C.; Jon E. Holland

(57) ABSTRACT

The present disclosure generally pertains to systems and methods for cancelling crosstalk in satellite access devices, such as DSLAMs. In one exemplary embodiment, a satellite DSLAM is configured to employ a vectored DSL modulation format, such as vectored VDSL, on both a customer premises (CP) side of the DSLAM and a network side of the DSLAM. For at least one tone communicated by the DSLAM, the DSLAM is configured to maintain a set of coefficients indicative of crosstalk contributions from interferers on both sides of the DSLAM. Based on such coefficients, the DSLAM is configured to cancel crosstalk that couples from one side of the DSLAM to the other.

12 Claims, 13 Drawing Sheets

SYSTEMS AND METHODS FOR CANCELLING CROSSTALK IN SATELLITE ACCESS DEVICES

CROSS REFERENCE TO RELATED APPLICATION

This application claims priority to U.S. Provisional Patent Application No. 61/387,709, entitled "Crosstalk Cancellation and Symbol Timing Systems and Methods to Support Synchronous Mode VDSL Operating on Both Network and Customer Premises Sides of Satellite DSLAM," and filed on Sep. 29, 2010, which is incorporated herein by reference.

RELATED ART

A digital subscriber line access multiplexer (DSLAM) is device that connects multiple subscriber lines to a high-speed network connection using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network connection. A DSLAM can be installed at a variety of locations, such as at a network facility (e.g., a central office).

In an effort to provide customers with higher data rates, existing copper facilities are being migrated to optical fiber, which provides data rates much greater than those traditionally enabled by copper. However, deploying fiber all of the way to the customer premises is expensive, and during the migration from copper to fiber, it is often the case where fiber is fed from a network facility, such as a central office, to an intermediate point closer to a customer premises without extending all of the way to the customer premises. The existing copper infrastructure is then leveraged to provide communication from the intermediate point to the customer premises. In such architecture, a DSLAM is installed at the intermediate point to provide the interface between fiber and copper. A DSLAM installed at an intermediate point between a network facility, such as a central office, and at least one customer premises is referred to as a "satellite" DSLAM.

A variety of DSL formats have been used for the communication from a fiber-fed satellite DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions.

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a fiber-fed DSLAM to one or more customer premises in an effort to improve the performance of VDSL signals and allow for longer reaches. Accordingly, VDSL is a popular alternative for the communication from a satellite DSLAM to a customer premises as fiber is being pushed closer and closer to the home.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for cancelling crosstalk in satellite access devices, such as DSLAMs. In one exemplary embodiment, a satellite DSLAM is configured to employ a vectored DSL modulation format, such as vectored VDSL, on both a customer-premises (CP) side of the DSLAM and a network side of the DSLAM. For at least one tone communicated by the DSLAM, the DSLAM is configured to maintain a set of coefficients indicative of crosstalk contributions from interferers on both sides of the DSLAM. Based on such coefficients, the DSLAM is configured to cancel crosstalk that couples from one side of the DSLAM to the other.

Figure 1:
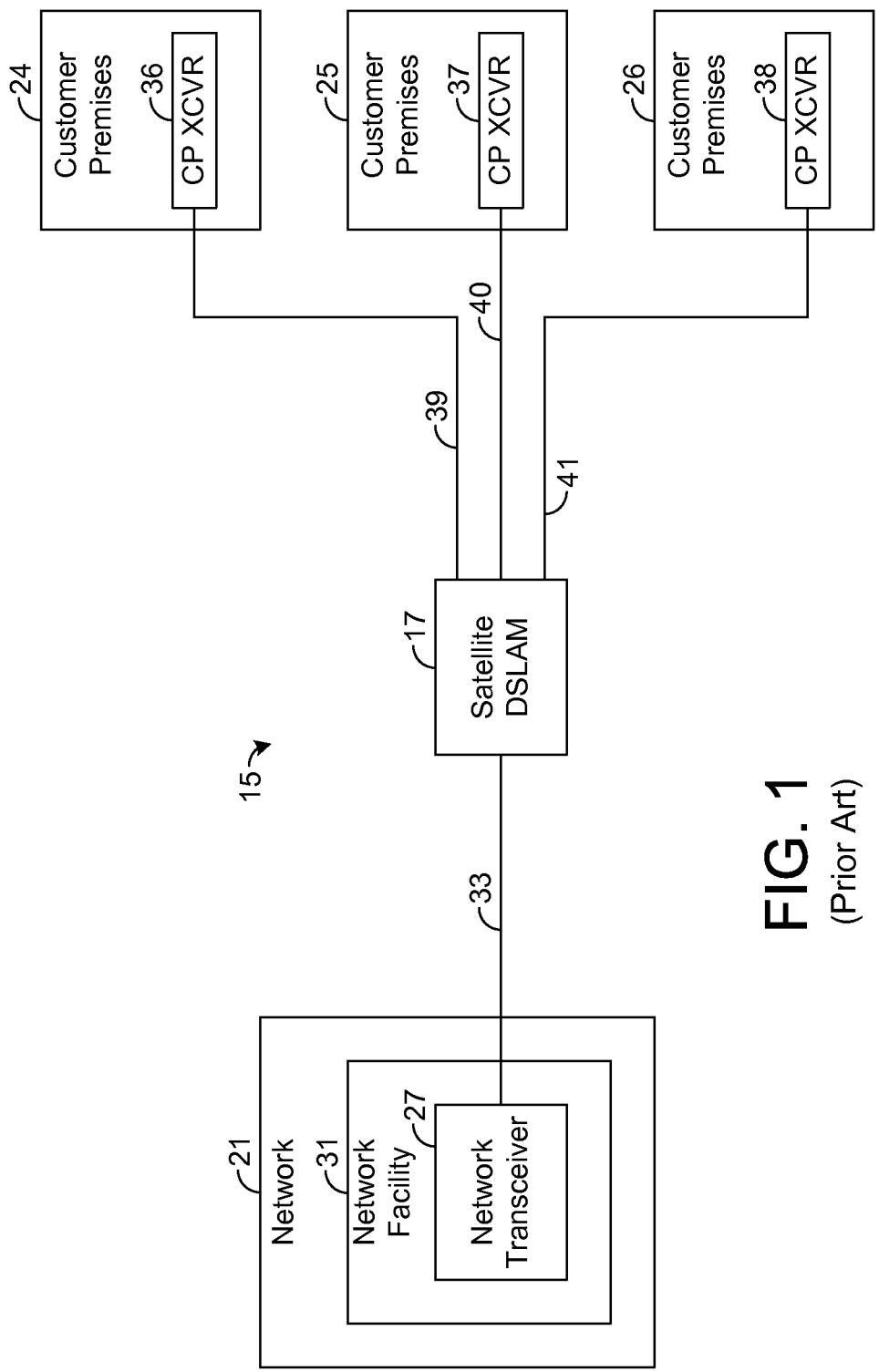
FIG. 1 is a block diagram illustrating a conventional communication system using a satellite DSLAM at an intermediate point between a network and a plurality of customer premises.

FIG. 1 depicts an exemplary communication system 15 utilizing a satellite DSLAM 17 for communication between a network 21, such as the Public Switched Telephone Network (PSTN) or other known communication network, and a plurality of customer premises 24-26. In this regard, on a network side, the DSLAM 17 is coupled to a network transceiver 27 at a network facility 31 via an optical fiber 33. On a CP side, the DSLAM 17 is coupled to a plurality of CP transceivers (XCVRs) 36-38 via a plurality of subscriber lines 39-41, such as twisted-wire pairs. As will be described in more detail hereafter, the DSLAM 17 is configured to employ vectored VDSL modulation formats on the CP side, but other types of modulation formats are possible as well.

Figure 2:
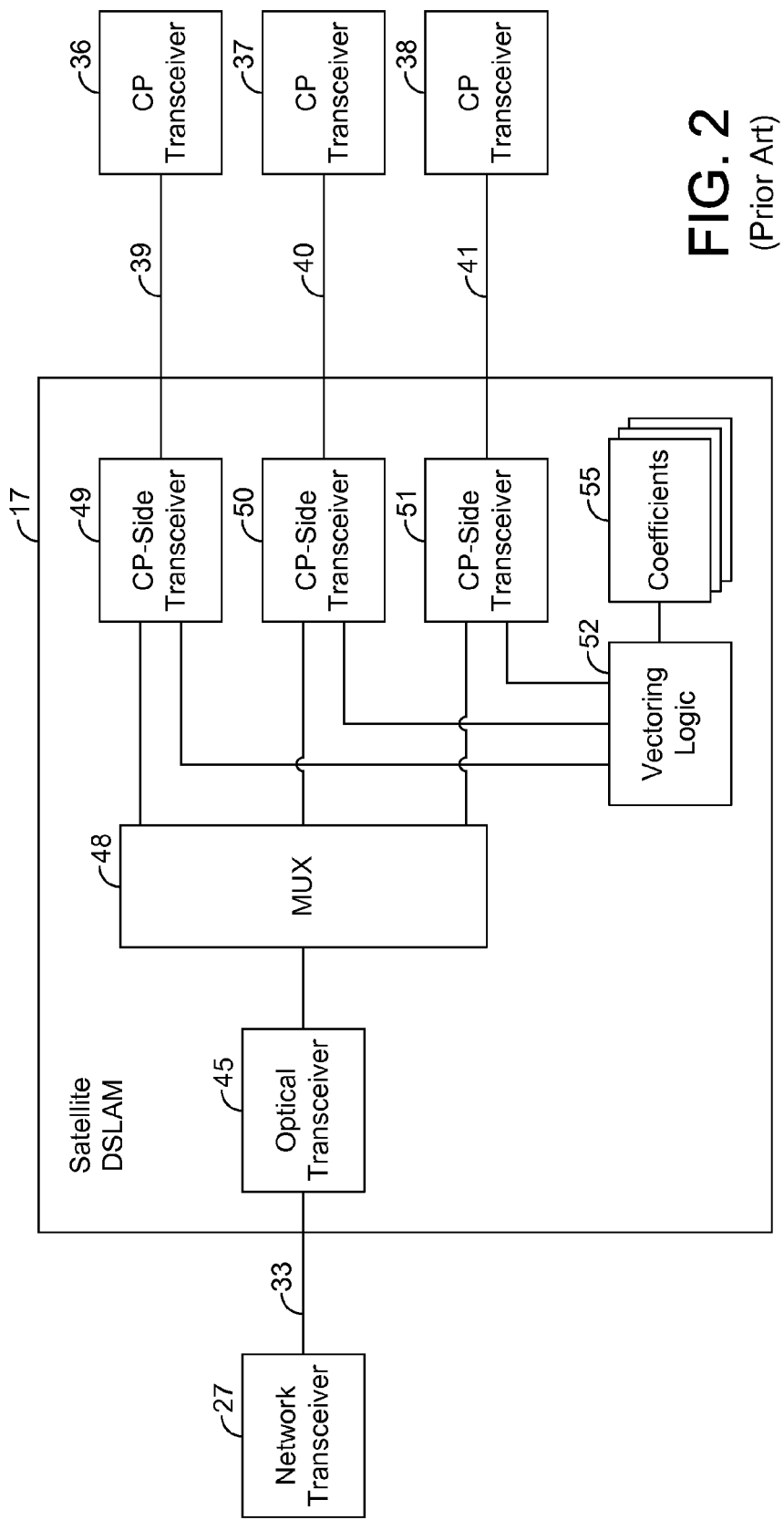
FIG. 2 is a block diagram illustrating a conventional satellite DSLAM.

FIG. 2 depicts the satellite DSLAM 17 of FIG. 1. As shown by FIG. 2, the DSLAM 17 has an optical transceiver 45 coupled to the fiber 33. The DSLAM 17 also has a multiplexer (MUX) 48 that is coupled between a plurality of CP-side transceivers 49-51 and the optical transceiver 45. In a downstream direction, the optical transceiver 45 receives from the fiber 33 an optical signal carrying a high-speed data stream. The transceiver 45 demodulates the optical signal to recover the high-speed data stream and transmits such stream to the multiplexer 48. The multiplexer 48 demultiplexes the high-speed data stream into a plurality of lower-speed data streams, and transmits each such lower-speed data stream to a respective CP-side transceiver 49-51, which modulates a carrier signal with such data stream and transmits the modulated signal across the respective subscriber line 39-41 coupled to it. In particular, each CP-side transceiver 49-51 employs vectored VDSL for communicating signals across the subscriber lines 39-41, respectively.

In an upstream direction, each CP-side transceiver 49-51 receives a modulated VDSL signal from the respective subscriber line 39-41 coupled to it. Each CP-side transceiver 49-51 demodulates the VDSL signal received by it to recover digital data carried by such signal and transmits the recovered digital data to the multiplexer 48, which multiplexes the digital data from all of the transceivers 49 into a high-speed data stream. The multiplexer 48 transmits such high-speed data stream to the optical transceiver 45, which modulates an optical signal with the data from the multiplexer 48. The optical transceiver 45 then transmits the modulated optical signal across the fiber 33.

It is well-known that crosstalk can degrade the quality of signals communicated across the subscriber lines 39-41. In this regard, the subscriber lines 39-41 are typically in close proximity to one another (e.g., within the same binder) at one or more points between the DSLAM 17 and the CP transceivers 36-38 such that energy from one subscriber line couples to other subscriber lines and interferes with the VDSL signals propagating along the other subscriber lines. Even if subscriber lines 39-41 are not physically located in the same binder, the ends of the lines 39-41 may be in close proximity at or within the DSLAM 17 such that energy can couple from one subscriber line to another and interfere with the VDSL signals. Interference that couples from one communication connection to another is referred to as crosstalk, and the effects of crosstalk can be significant, particularly for high-bandwidth signals, such as those that are typically employed in VDSL.

As shown by FIG. 2, the DSLAM 17 comprises vectoring logic 52 that is configured to cancel crosstalk. The vectoring logic 52, which is sometimes referred to as a "vector engine," is often implemented in software and packaged within an integrated circuit (IC) that is dedicated for performing crosstalk cancellation. Typically, the vectoring logic 52 maintains sets of coefficients 55 to be used for cancelling crosstalk in the VDSL signals communicated across the subscriber lines 39-41, as will be described in more detail hereafter.

In this regard, each VDSL signal typically carries a plurality of tones, and each set of coefficients 55 corresponding to a respective one of the tones communicated by or with a respective one of the transceivers 49-51. The set of coefficients 55 corresponding to a tone received by a transceiver 49-51 is used to filter, tone-by-tone, the crosstalk induced by the interfering tones being communicated by the subscriber lines 39-41 coupled to other transceivers 49-51.

For illustrative purposes, assume that there are three subscriber lines 39-41, as shown by FIG. 2, and that each VDSL signal communicated across each subscriber line 39-41 has three tones. For purposes of simplicity, assume that each CP transceiver 36-38 transmits a VDSL signal to the DSLAM 17 such that there are three VDSL signals transmitted across the subscriber lines 39-41, respectively.

Figure 3:
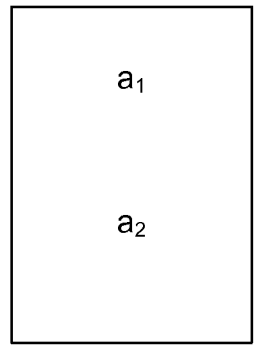
FIG. 3 is a block diagram illustrating a conventional coefficient set used by vectoring logic to cancel crosstalk.

FIG. 3 depicts an exemplary set of coefficients 55 corresponding to one of the tones, referred to hereafter for this example as the "victim tone," on one of the subscriber lines 39-41. For illustrative purposes, assume that the victim tone is carried by the subscriber line 39, which is referred to as the "victim subscriber line" for this example. Each of the coefficients of FIG. 3 is associated with a respective one of the tones, referred to hereafter as "interfering tones," that interferes with the victim tone. Note such interfering tones are carried by the other subscriber lines 40 and 41, referred to hereafter as the "interfering subscriber lines" for this example. In particular, assuming that only one of the tones carried by the subscriber line 40 is in the same frequency range as the victim tone and assuming that transceivers 36-38 and 49-51 remain synchronous and orthogonality is maintained across the tones, the subscriber line 40 carries only one tone that interferes with the victim tone. This interfering tone of the subscriber line 40 is associated with coefficient $a_1$. Assuming that only one of the tones carried by the subscriber line 41 is in the same frequency range as the victim tone and assuming that transceivers 36-38 and 49-51 remain synchronous and orthogonality is maintained across the tones, the subscriber line 41 carries only one tone that interferes with the victim tone. This interfering tone of the subscriber line 41 is associated with coefficient $a_2$.

As the VDSL signals are received by the transceivers 49-51, each transceiver 49-51 demodulates the VDSL signal received by it to recover symbols of the three tones carried by such signal and then transmits the recovered symbols to the vectoring logic 52. For the current symbol of the victim tone corresponding to the set of coefficients 55 shown by FIG. 3, the vectoring logic 52 estimates a respective crosstalk contribution from each of the interfering tones carried by the interfering subscriber lines 40 and 41. As an example, the vectoring logic 52 combines the symbol of the interfering tone from subscriber line 40 with the coefficient $a_1$ to estimate a crosstalk contribution from this interfering tone affecting the symbol of the victim tone. The vectoring logic 52 combines (e.g., subtracts) the estimated crosstalk contribution with the symbol of the victim tone such that the crosstalk induced by the interfering tone from the subscriber line 40 is canceled. This process is repeated for each of the other interfering tones.

In particular, the vectoring logic 52 combines the symbol of the interfering tone from subscriber line 41 with the coefficient $a_2$ to estimate a crosstalk contribution from this interfering tone affecting the symbol of the victim tone. The vectoring logic 52 combines (e.g., subtracts) the estimated crosstalk contribution with the symbol of the victim tone such that the crosstalk induced by the interfering tone from the subscriber line 41 is canceled.

The processing performed by the vectoring logic 52 for each of the interfering tones from the subscriber lines 40 and 41 effectively filters the symbol of the victim tone to remove the crosstalk induced by the interfering tones. The process of respectively associating the symbols of the interfering tones with the coefficients corresponding to the victim tone is generally referred to as vectoring.

After cancelling the crosstalk affecting the symbol of the victim tone, the vectoring logic 52 transmits the symbol to the transceiver 49 coupled to the victim subscriber line 39. Such transceiver 49 decodes the symbol and provides an error signal indicative of an amount of error in such symbol. The transceiver 49 transmits the error signal to the vectoring logic 52, which then adaptively updates the set of coefficients 55 corresponding to the victim tone (i.e., the coefficients used to cancel the crosstalk from the symbol of the victim tone) so that the set of coefficients 55 is adapted to changing crosstalk characteristics over time. As an example, the least means squares (LMS) algorithm or some other known coefficient update algorithm may be used to update the set of coefficients 55 based on the error signal. Moreover, the vectoring logic 52 similarly maintains a respective set of coefficients 55 for each tone received from the subscriber lines 39-41 thereby enabling the vectoring logic 52 to cancel crosstalk for all of the received tones via similar techniques.

Note that the vectoring logic 52 is configured to use techniques similar to those described above in order to precode the downstream signals transmitted by the transceivers 49-51 across the subscriber lines 39-41, respectively, to mitigate for crosstalk affecting these signals. In this regard, the vectoring logic 52 maintains a respective set of coefficients 55 for each downstream tone transmitted by the transceivers 49-51, as described above for the upstream tones received by the transceivers 49-51 from the subscriber lines 39-41.

For illustrative purposes, assume that the victim subscriber line 39 carries a downstream tone, referred to hereafter as the "victim transmit tone" for this example, that is affected by crosstalk from tones, referred to hereafter as the "interfering transmit tones" for this example, transmitted by the transceivers 50 and 51 across the interfering subscriber lines 40 and 41. For the set of coefficients 55 corresponding to the victim transmit tone, each coefficient is associated with a respective interfering transmit tone communicated across a respective one of the interfering subscriber lines 40 and 41. Before transmitting a symbol of the victim transmit tone, the transmitting transceiver 49 provides such symbol to the vectoring logic 52, and the other transceivers 50 and 51 provide the symbols of the interfering transmit tones to be transmitted across the other subscriber lines 40 and 41 at the same time as the symbol for the victim transmit tone. The symbol of each interfering transmit tone is associated with a respective coefficient to estimate the amount of crosstalk contribution from this interfering transmit tone expected to affect the symbol of the victim transmit tone. The vectoring logic 52 then combines the inverse of the estimated crosstalk contribution with the symbol of the victim transmit tone to precode the victim transmit tone. After performing such precoding of the symbol of the victim transmit tone for each interfering transmit tone, the precoded symbol of the victim transmit tone is transmitted by the vectoring logic 52 to the transceiver 49, and such transceiver 49 modulates a carrier signal with the precoded symbol for transmission across the victim subscriber line 39. The crosstalk that then couples to the victim subscriber line 39 affecting the symbol of the victim transmit tone is effectively cancelled due to the precoding such that the symbol arrives at the CP transceiver 36 substantially free of crosstalk.

The CP transceiver 36 is configured to decode the precoded symbol and determine an error for such symbol. The CP transceiver 36 then transmits an error signal indicative of such error back to the DSLAM 17 so that the associated set of coefficients 55 (i.e., the coefficients used to precode the victim transmit tone) can be adaptively updated to account for changing crosstalk characteristics. Moreover, the vectoring logic 52 similarly maintains a set of coefficients 55 for each tone transmitted by the transceivers 49-51 across the subscriber lines 39-41 thereby enabling the vectoring logic 52 to precode the signals transmitted by such transceivers 49-51 in order to cancel crosstalk for all of the downstream tones via similar techniques.

It should be noted that there may be any number of subscriber lines 39-41 and any number of tones per subscriber line 39-41. Indeed, in practice, there are typically many more tones per subscriber line 39-41 and many more subscriber lines 39-41 serviced by a satellite DSLAM 17 than described in the above examples. As the number of tones increases, the amount of processing required to cancel crosstalk from each tone generally increases exponentially.

It should be further noted that the upstream and downstream channels are frequency division multiplexed according to current VDSL standards. That is, the frequency of the signals transmitted upstream is different than the frequency of the signals transmitted downstream. As long as the transceivers 36-38 and 49-51 remain synchronous and orthogonality is maintained across the tones, there should be no "bleeding" or crosstalk interference from the upstream VDSL signals to the downstream VDSL signals and vice versa.

To ensure such synchronization, the CP-side transceivers 49-52, which are co-located in the same DSLAM 17, share a common clock signal. Further, current VDSL standards specify a synchronous mode of operation by which the transceivers 49-51 communicate with the CP transceivers 36-38 such that each CP transceiver 36-38 operates synchronously with the respective CP-side transceiver 49-51 coupled to it. Accordingly, all of the transceivers 36-38 and 49-51 operate synchronously with respect to one another and are configured to begin to transmit their respective symbols at the same time within an acceptable tolerance to prevent bleeding (i.e., crosstalk close to the boundary between the upstream frequency range and the downstream frequency range). However, due to different lengths of subscriber lines 39-41, it is possible for symbols transmitted at the same time to arrive at their respective receiving transceivers at different times.

Notably, all of the crosstalk canceled by the satellite DSLAM 17 is far-end crosstalk, often referred to as FEXT. FEXT generally refers to crosstalk that is received at one location but is induced by an interfering signal transmitted at a remote location (e.g., the far end of communication media carrying the signal). In particular, in the upstream direction, the vectoring logic 52 at the satellite DSLAM 17 cancels crosstalk affecting the signals received by the satellite DSLAM 17 and induced by signals transmitted at a customer premises 24-25 remote from the satellite DSLAM 63. In the downstream direction, the vectoring logic 52 at the satellite DSLAM 63 cancels crosstalk affecting the signals received by customer premises transceivers 36-38 and induced by signals transmitted at the satellite DSLAM 17. Since the upstream and downstream channels are separated in frequency, there should be no near-end crosstalk (NEXT) affecting the signals communicated across the subscriber lines 39-41.

Given the high data rates enabled by VDSL, it would be desirable to employ VDSL on the network side of the DSLAM so that existing copper infrastructure, as an alternative to fiber, could be used for the link from the network facility to the satellite DSLAM. However, such a solution is plagued with crosstalk problems. In this regard, the high-frequency communication used for VDSL generates a large amount of crosstalk energy such that crosstalk can couple from one side of the satellite DSLAM to the other. Specifically, crosstalk energy from signals communicated between the network facility and the satellite DSLAM can interfere with the signals communicated between the customer premises and the satellite DSLAM and vice versa. Such interference can prevent the deployment of VDSL on both sides of a satellite DSLAM.

Figure 4:
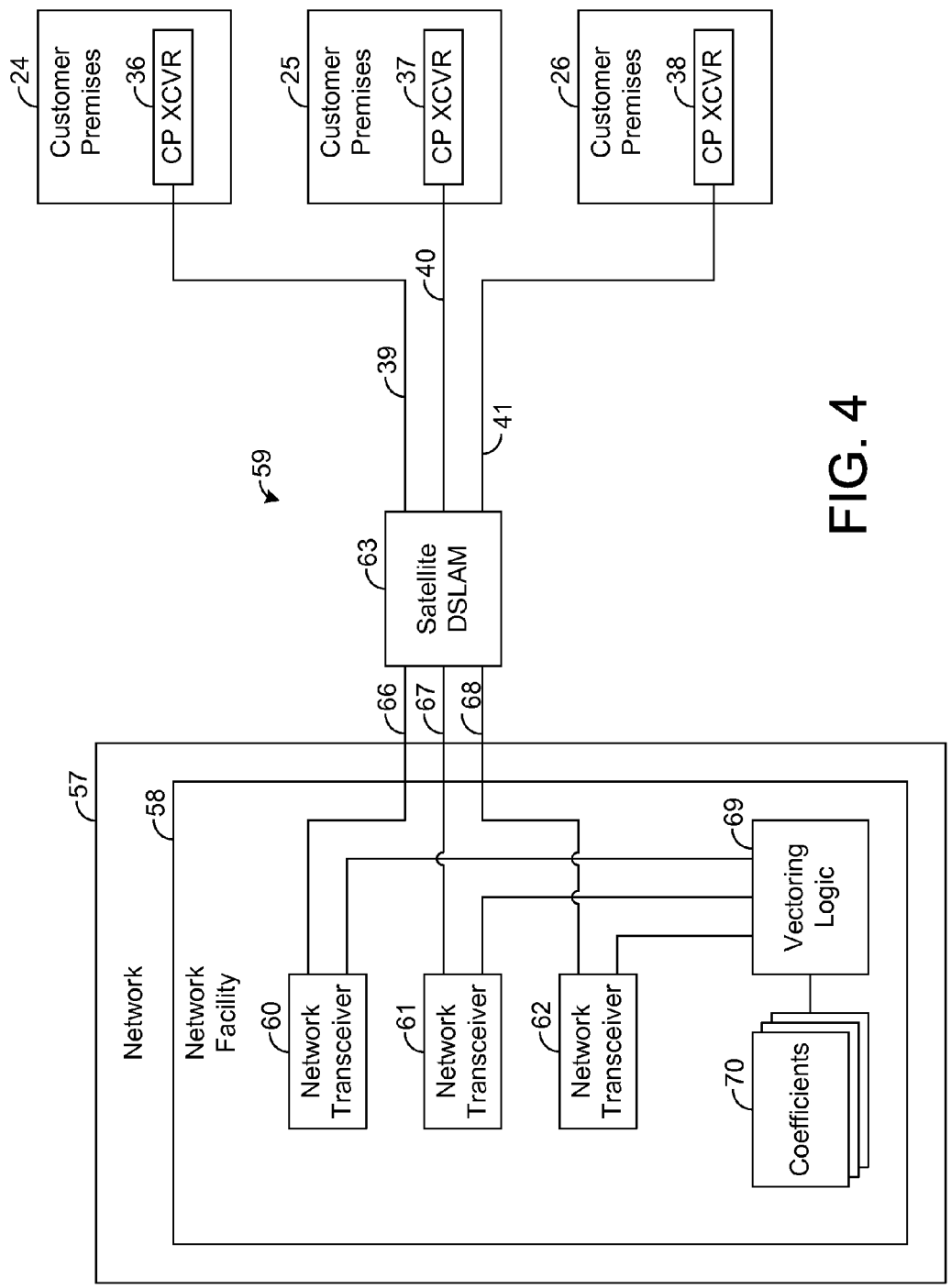
FIG. 4 is a block diagram illustrating an exemplary embodiment of a communication system using a satellite DSLAM at an intermediate point between a network and a plurality of customer premises.

FIG. 4 depicts an exemplary embodiment of a communication system 59 in accordance with the present disclosure. Like the conventional system 15 of FIG. 1, the system 59 has a satellite DSLAM 63 between a network 57 and a plurality of customer premises 24-26. However, rather than feeding the DSLAM 63 with an optical fiber from a network facility 58, the DSLAM 63 is coupled to a plurality of network transceivers 60-62 via a plurality of conductive network connections 66-68, respectively, such as twisted-wire pairs. Thus, if desired, existing copper infrastructure may be utilized for the network segment from the network facility 58 to the DSLAM 63, as well as from the DSLAM 63 to the customer premises 24-26. In one exemplary embodiment, vectored VDSL (e.g., vectored first-generation VDSL or vectored VDSL2) is used for communication on both sides of the satellite DSLAM 63, but other types of modulation formats may be used in other embodiments. For illustrative purposes, the satellite DSLAM 63 will be described as communicating via vectored VDSL on both the network side and the CP side.

Note that, for simplicity, FIG. 4 shows three network transceivers 60-62, three network connections 66-68, three subscriber lines 39-41, and three CP transceivers 36-38. However, there may be any number of such components in other embodiments, and it is unnecessary for the number of network connections 66-68 to equal the number of subscriber lines 39-41. In addition, any customer premises 24-26 may have more than one CP transceiver, and it is unnecessary for there to be more than one customer premises serviced by the satellite DSLAM 63. Various other changes and modifications to the system 59 shown by FIG. 4 would be apparent to one of ordinary skill upon reading this disclosure.

As described above, one issue with the architecture shown by FIG. 4 is crosstalk interference between the signals propagating across the network connections 66-68 and the signals propagating across the subscriber lines 39-41. In this regard, the network connections 66-68 are preferably bundled in different binders relative to the subscriber lines 39-41, but the ends of the connections 66-68 may be positioned in close proximity to the ends of the subscriber lines 39-41 in or near the DSLAM 63 such that signals communicated on the network side of the DSLAM 63 can interfere with signals communicated on the CP side of the DSLAM 63 and vice versa. Crosstalk can also occur between signals transmitted across the network connections 66-68 and between signals transmitted across the subscriber lines 39-41. The aforementioned crosstalk can significantly degrade the quality of signals communicated by the DSLAM 63.

In one exemplary embodiment, as will be described in more detail hereafter, crosstalk cancellation techniques, similar to those described above for cancelling crosstalk on the subscriber lines 39-41 of FIG. 2, are used to cancel crosstalk on the subscriber lines 39-41 of FIG. 4. In addition, crosstalk cancellation techniques similar to those described above for cancelling crosstalk on the subscriber lines 39-41 of FIG. 2 are used to cancel crosstalk on the network connections 66-68. The use of such cancellation techniques, however, still leaves the system 59 vulnerable to crosstalk across the DSLAM 63 (i.e., from the network connections 66-68 to the subscriber lines 39-41 and vice versa), referred to hereafter as "crossover crosstalk." To mitigate the effects of such crossover crosstalk, the DSLAM 63 is configured to use vectoring techniques, similar to those described above, along with the knowledge of the symbols transmitted from the DSLAM 63 to cancel the crossover crosstalk caused by such symbols.

Notably, the crossover crosstalk is dissimilar to the FEXT that is cancelled by the conventional DSLAM 17 of FIG. 2. In particular, the crossover crosstalk is more similar to NEXT in that the crossover crosstalk originates from signals transmitted by the satellite DSLAM 63 and affects the signals received by the satellite DSLAM 63. That is, the interfering tones are transmitted by the satellite DSLAM 63 and the victim tones are also received by the satellite DSLAM 63. However, NEXT is typically associated with signals that are transmitted within the same binder or a set of binders on the same side of the DSLAM where the victim tone travels is a direction different than that for the interfering tones. Crossover crosstalk on the other hand is associated with signals that are in different binders on different sides of the DSLAM. For example, crossover crosstalk affecting a victim tone transmitted by the CP-side transceiver 77 away from the network 57 may be induced by an interfering tone transmitted to the satellite DSLAM 63 in the same direction as the victim tone. Moreover, as described above, the satellite DSLAM 63 is configured to cancel FEXT, similar to the conventional DSLAM 17 of FIG. 2, but it is also configured to cancel crossover crosstalk, as will be described in more detail hereafter.

As shown by FIG. 4, the network transceivers 60-62 are coupled to vectoring logic 69 at the network facility 58. In one exemplary embodiment, the vectoring logic 69 is configured similar or identical to the conventional vectoring logic 52 of FIG. 2 and uses sets of coefficients 70, like the conventional vectoring logic 52 uses sets of coefficients 55, to cancel crosstalk from the signals communicated across the network connections 66-68. Specifically, the vectoring logic 69 cancels the crosstalk that couples from one network connection 66-68 to another.

In this regard, for each symbol received by the network transceivers 60-62 from the connections 66-68 in the upstream direction, the vectoring logic 69 calculates a respective crosstalk contribution from each upstream interfering tone and digitally combines (e.g., subtracts) the symbol with the calculated crosstalk contribution to cancel crosstalk from the symbol. Accordingly, the crosstalk that affects the upstream symbol from the connections 66-68 is removed from the symbol.

For each symbol transmitted in the downstream direction from the network transceivers 60-62 across the connections 66-68, the vectoring logic 69 precodes the symbol with the inverse of the expected amount of crosstalk to be experienced on the network connections 66-68 such that the crosstalk is effectively canceled from the symbol as it propagates toward the satellite DSLAM 63. In this regard, the vectoring logic 69 calculates a respective crosstalk contribution from each downstream interfering tone and digitally combines the symbol with the inverse of the crosstalk contribution. Accordingly, the crosstalk that affects the symbol from the connections 66-68 is removed from the symbol before it arrives at the satellite DSLAM 63.

Figure 5:
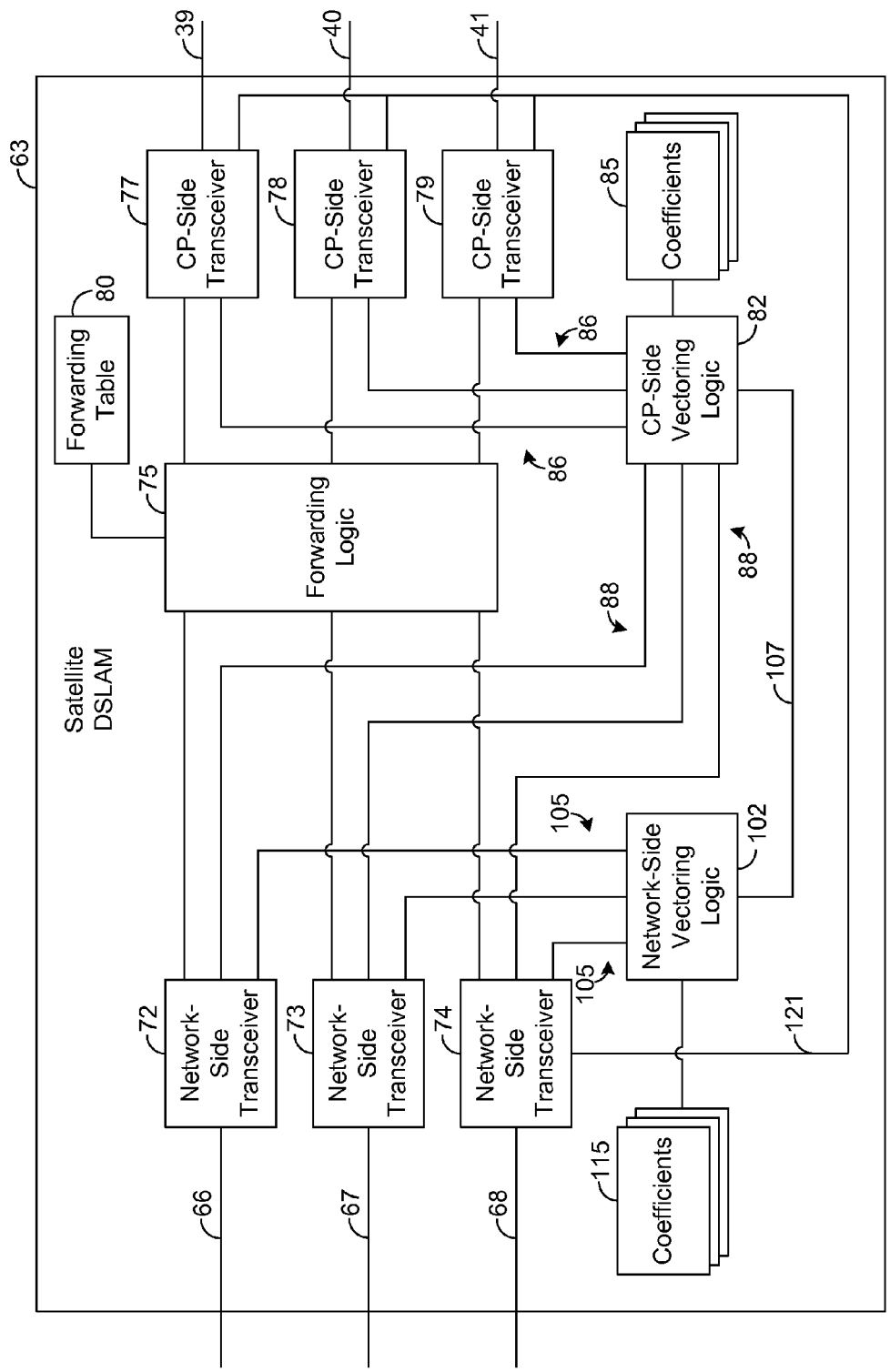
FIG. 5 is a block diagram illustrating an exemplary embodiment of a satellite DSLAM, such as is depicted by FIG. 4.

FIG. 5 depicts an exemplary embodiment of the satellite DSLAM 63 depicted by FIG. 4. As shown by FIG. 5, the DSLAM 63 has a plurality of network-side transceivers 72-74 respectively coupled to the network connections 66-68. The DSLAM 63 also has forwarding logic 75 that is coupled between a plurality of CP-side transceivers 77-79 and the network-side transceivers 72-74. Note that a "network-side" transceiver refers to a transceiver that is coupled to a communication connection that extends toward the network 57 and carries signals from such transceiver toward the network 57. Though it may be practical in some situations to position a network-side transceiver on the side of the DSLAM 63 closest to the network 57, such positioning of a network-side transceiver is unnecessary, and a network-side transceiver may be located anywhere within the DSLAM 63. Similarly, a "CP-side" transceiver refers to a transceiver that is coupled to a communication connection that extends toward a customer premises and carries signals from such transceiver toward the customer premises. Though it may be practical in some situations to position a CP-side transceiver on the side of the DSLAM 63 closest to the customer premises, such positioning of a network-side transceiver is unnecessary, and a network-side transceiver may be located anywhere within the DSLAM 63.

In a downstream direction, each network-side transceiver 72-74 receives from the respective network connection 66-68 coupled to it a VDSL signal modulated with data. Each transceiver 72-74 demodulates the VDSL signal received by it to recover digital data and transmits such digital data to the forwarding logic 75. The forwarding logic 75 transmits the data received from the network-side transceivers 72-74 to the CP-side transceivers 77-79 as appropriate. As an example, in one embodiment, the DSLAM 63 has a forwarding table 80 that maps data streams to transceivers 72-74 and 77-79, and the forwarding logic 75 forwards each data packet from the network-side transceivers 72-74 to the CP-side transceivers 77-79 based on the forwarding table 80. Each CP-side transceiver 77-79 modulates a carrier signal with the data received from the forwarding logic 75 and then transmits the modulated signal across the respective subscriber line 39-41 coupled to it. In particular, each CP-side transceiver 77-79 employs vectored VDSL for communicating signals across its respective subscriber line 39-41.

In an upstream direction, each CP-side transceiver 77-79 receives a modulated VDSL signal from the respective subscriber line 39-41 coupled to it. Each CP-side transceiver 77-79 demodulates the VDSL signal received by it to recover digital data carried by such signal and transmits the recovered digital data to the forwarding logic 75, which forwards such data to the network-side transceivers 72-74 as appropriate (e.g., based on the forwarding table 80). Each network-side transceiver 72-74 modulates a carrier signal with the data received from the forwarding logic 75 and then transmits the modulated signal across the respective network connection 66-68 coupled to it. In particular, each network-side transceiver 72-74 employs vectored VDSL for communicating signals across its respective network connection 66-68.

As shown by FIG. 5, the DSLAM 63 has CP-side vectoring logic 82 that is similar to the conventional vectoring logic 52 shown by FIG. 2. As shown by FIG. 5, the CP-side vectoring logic 82 is coupled to and communicates with the CP-side transceivers 77-79 via a plurality of data connections 86. In one exemplary embodiment, the vectoring logic 82 uses sets of coefficients 85, like the conventional vectoring logic 52 uses sets of coefficients 55, to cancel crosstalk from the signals communicated across the subscriber lines 39-41. Specifically, the vectoring logic 82 cancels FEXT that couples from one subscriber line 39-41 to another.

In this regard, the vectoring logic 82 stores sets of coefficients 85 in which each coefficient set 85 corresponds to a respective tone communicated by or with the CP-side transceivers 77-79, and the vectoring logic 82 uses the corresponding coefficient set 85 to cancel crosstalk tone-by-tone induced by other interfering tones communicated by or with the CP-side transceivers 77-79. Thus, each set of coefficients 85 includes coefficients associated with the interfering tones communicated across the subscriber lines 39-41, as described above for the sets of coefficients 55 in the conventional system 15.

Figure 6:
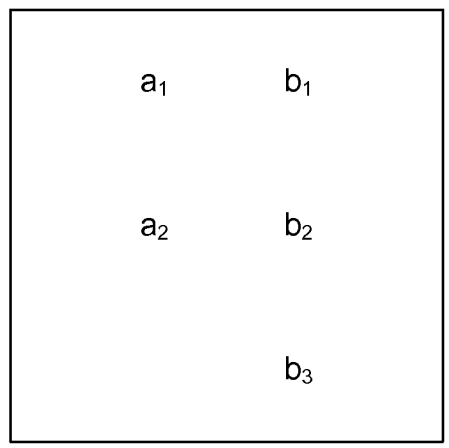
FIG. 6 is a block diagram illustrating an exemplary coefficient set used by vectoring logic, such as is depicted by FIG. 5.

As an example, assume that a set of coefficients 85 corresponds to an upstream tone, referred to hereafter as "victim tone" for this example, received by the DSLAM 63 from one of the subscriber lines 39-41. For illustrative purposes, assume that the victim tone is carried by the subscriber line 39, which is referred to as the "victim subscriber line" for this example. The foregoing coefficient set 85 includes coefficients respectively associated with the upstream tones, referred to as "upstream interfering tones," communicated across the other subscriber lines 40-41 that interfere with the victim tone. FIG. 6 depicts an exemplary set of coefficients 85 corresponding to the victim tone, assuming that each subscriber line 39-41 carries three tones. As can be seen by comparing FIG. 6 to FIG. 3, similar to the conventional sets of coefficients 55, the coefficient set 85 of FIG. 6 includes coefficients $a_1$ and $a_2$, which are used by the vectoring logic 82 to cancel from the victim tone the crosstalk induced by the upstream interfering tones carried by the interfering subscriber lines 40 and 41.

In particular, for each symbol of the victim tone, the vectoring logic 82 receives such symbol from the CP-side transceiver 77 coupled to the victim subscriber line 39, and the vectoring logic 82 receives from the transceivers 78 and 79 the symbols of each of the upstream interfering tones communicated across the subscriber lines 40 and 41 at the same time as the received symbol of the victim tone. The vectoring logic 82 then combines each upstream interfering tone with the coefficient respectively associated with such interfering tone to determine an amount ("crosstalk contribution") that the interfering tone affects the symbol of the victim tone. The vectoring logic 82 then digitally combines (e.g., subtracts) the determined crosstalk contribution with the symbol of the victim tone to cancel the crosstalk induced by the interfering tone. Such cancellation is performed tone-by-tone for each upstream interfering tone such that the symbol of the victim tone filtered by the vectoring logic 82 is substantially free of the crosstalk induced by the upstream interfering tones.

After canceling crosstalk from the symbol of the victim tone, such symbol is transmitted back to the transceiver 77, which then decodes the symbol and determines an error associated with the symbol. The transceiver 77 transmits the error signal to the vectoring logic 82, which then adaptively updates the set of coefficients 85 corresponding to the victim tone via the least means square (LMS) algorithm or some other known coefficient update algorithm. Accordingly, for each upstream symbol received by the CP-side transceivers 77-79, the crosstalk induced by the upstream signals propagating along the subscriber lines 39-41 is canceled by the CP-side vectoring logic 82.

As shown by FIG. 5, the vectoring logic 82 is also coupled to and communicates with each of the network-side transceivers 72-74 via a plurality of data connections 88. The vectoring logic 82 is configured to receive via the connections 88 each symbol of each tone transmitted by the network-side transceivers 72-74 across the network connections 66-68. Since these upstream tones are in the same frequency range as the upstream tones received by the CP transceivers 77-79 from the subscriber lines 39-41, crossover crosstalk couples from the network connections 66-68 to the subscriber lines 39-41 and vice versa. The vectoring logic 82 is configured to use the upstream symbols transmitted by the network-side transceivers 72-74 to cancel the crossover crosstalk that couples from the network connections 66-68 to the subscriber lines 39-41.

In this regard, consider the example described above in which the vectoring logic 82 is canceling FEXT from a victim tone received by the CP-side transceiver 77 from the subscriber line 39. Referring to FIG. 6, in addition to the coefficients used to cancel FEXT affecting the victim tone from the subscriber lines 40 and 41, the exemplary set of coefficients 85 corresponding to the victim tone also includes coefficients associated with the upstream interfering tones transmitted across the network connections 66-68 by the network-side transceivers 72-74. For illustrative purposes, the coefficients associated with tones on the CP side (i.e., carried by the subscriber lines 39-41) shall be referred to herein as "a" coefficients, and the coefficients associated with tones on the network side (i.e., carried by the network connections 66-68) shall be referred to herein as "b" coefficients. As described above for the interfering subscriber lines 40 and 41, each of the interfering subscriber lines 66-68 on the network side carries one interfering tone assuming that no bleeding occurs across frequency ranges. Accordingly, since there are three interfering subscriber lines 66-68 with each such interfering subscriber line 66-68 carrying a respective interfering tone affecting the victim tone carried by the subscriber line 39, there are three "b" coefficients, $b_1$-$b_3$, shown in FIG. 6.

As described above, when a symbol of the victim tone is received by the vectoring logic 82, such logic 82 combines (e.g., multiplies) the respective symbol of each upstream interfering tone from the subscriber lines 40 and 41 with its associated "a" coefficient to determine a respective crosstalk contribution that is combined with (e.g., subtracted from) the symbol of the victim tone to cancel the FEXT induced by the upstream interfering tone. Similarly, the vectoring logic 82 is also configured to combine (e.g., multiplies) the respective symbol of each upstream interfering tone transmitted across the network connections 66-68 with its associated "b" coefficient to determine a respective crosstalk contribution that is combined with (e.g., subtracted from) the symbol of the victim tone to cancel the crossover crosstalk induced by the upstream interfering tone.

As an example, assume that a tone (referred to in this example as the "upstream interfering tone") carried by the network connection 66 is associated with coefficient $b_1$ in the set of coefficients 85 corresponding to the victim tone. In such example, the network-side transceiver 72 transmits to the vectoring logic 82 the symbol of the upstream interfering tone transmitted across the connection 66 at the same time that the symbol of the victim tone is transmitted across its respective subscriber line 39. The vectoring logic 82 combines the symbol from the transceiver 72 with coefficient $b_1$ to determine a crosstalk contribution indicative of an estimated amount of crossover crosstalk induced by the upstream interfering tone and affecting the symbol of the victim tone. The vectoring logic 82 combines such crosstalk contribution with the symbol of the victim tone to cancel the crossover crosstalk induced by the upstream interfering tone. Once each symbol of the interfering tones transmitted by the transceivers 72-74, 78, and 79 has been combined with the symbol of the victim tone, the symbol of the victim tone is transmitted to the transceiver 77, which decodes the symbol and provides an error signal as indicated above. Each coefficient in the coefficient set 85 corresponding to the victim tone, including both the "a" coefficients and the "b" coefficients, is adaptively updated based on the error signal.

Accordingly, for the victim tone carried by the subscriber line 39, crosstalk from upstream interfering tones carried by the subscriber lines 40 and 41 and the network connections 66-68 is canceled thereby improving the quality of the victim tone. In a similar manner, the vectoring logic 82 is configured to cancel crosstalk in each upstream tone received by the CP-side transceivers 77-79 from the subscriber lines 39-41.

As illustrated by FIG. 6, the number of "a" coefficients for a given victim tone may differ from the number of "b" coefficients. In one exemplary embodiment, the corresponding set of coefficients 85 defines multiple matrices (e.g., one matrix having "a" coefficients and another having "b" coefficients) that are separately applied to the symbol of the victim tone.

In addition, similar to the conventional vectoring logic 52 of FIG. 2, the vectoring logic 82 of FIG. 5 is preferably configured to precode the downstream symbols transmitted by the CP-side transceivers 77-79 across the subscriber lines 39-41 to mitigate the effects of FEXT that couples from one subscriber line 39-41 to another. Thus, like the conventional vectoring logic 52, the vectoring logic 82 of FIG. 5 cancels, from the symbols communicated by or with the CP-side transceivers 77-79, crosstalk induced by both the upstream and downstream tones propagating on the subscriber line 39-41. Specifically, the vectoring logic 82 cancels from the upstream tones on the subscriber lines 39-41 FEXT induced by other upstream tones on the subscriber lines 39-41, as described above, and the vectoring logic 82 also precodes the downstream tones on the subscriber lines 39-41 to cancel FEXT induced by other downstream tones on the subscriber lines 39-41. However, the vectoring logic 82 also cancels from the upstream tones received by the CP-side transceivers 77-79 crossover crosstalk induced by the upstream tones transmitted by the network-side transceivers 72-74.

Note that the foregoing cancellations can be achieved without substantially modifying existing vectoring logic 52. In this regard, except for changes, if any, to synchronize the timing of the CP-side transceivers 77-79 with the network-side transceivers 72-74, as will be described in more detail hereafter, the configuration of the vectoring logic 82 may be identical to that of the conventional vectoring logic 52. In this regard, to enable the vectoring logic 82 to cancel crossover crosstalk that couples from the network connections 66-68 to the subscriber lines 39-41, the sets of coefficients 85 corresponding to the upstream victim tones received by the CP-side transceivers 77-79 are expanded, relative to the conventional sets of coefficients 55, to include the "b" coefficients in addition to the "a" coefficients that are included in the conventional sets of coefficients 55. Otherwise, the configurations of the vectoring logic 82 and the sets of coefficients 85 can be the same as the vectoring logic 52 and the sets of coefficients 55, respectively.

Referring to FIG. 5, the DSLAM 63 further comprises network-side vectoring logic 102 that is coupled to the network-side transceivers 72-74 via a plurality of data connections 105 and to the CP-side vectoring logic 82 via at least one data connection 107. The network-side vectoring logic 102 is configured to provide crosstalk cancellation signals for cancelling, from the downstream tones received by the network-side transceivers 72-74, crossover crosstalk that couples from the subscriber lines 39-41 to the network connections 66-68.

In this regard, the vectoring logic 102 maintains sets of coefficients 115 that are used to cancel crosstalk from the downstream tones received by the network-side transceivers 72-74 similarly to the way that the sets of coefficients 85 are used to cancel crosstalk from the upstream tones received by the CP-side transceivers 77-79. In particular, each set of coefficients 115 corresponds to a downstream tone received by a respective one of the network-side transceivers 72-74.

The precoded symbols to be transmitted in the downstream direction from the CP-side transceivers 77-79 across the subscriber lines 39-41 are transmitted from the CP-side vectoring logic 82 to the network-side vectoring logic 102 via the connection 107. As described above, the CP-side vectoring logic 82 is responsible for precoding such symbols and, hence, has access to such symbols.

For each downstream symbol received by the network-side transceivers 72-74, the vectoring logic 102 is configured to calculate a crosstalk contribution from each downstream interfering tone transmitted by the CP-side transceivers 77-79. Based on the crosstalk contributions for all such downstream interfering tones affecting the downstream victim symbol, the vectoring logic 102 forms a crosstalk cancellation signal for cancelling the crossover crosstalk induced by the downstream interfering tones carried by the subscriber lines 39-41. The vectoring logic 102 is configured to transmit the crosstalk cancellation signal to the network-side transceiver 72-74 receiving the downstream victim symbol, and the crosstalk cancellation signal is digitally combined with (e.g., subtracted from) from such downstream victim symbol, thereby cancelling crossover crosstalk induced by the downstream interfering tones propagating along the subscriber lines 39-41. After canceling such crosstalk from the downstream victim symbol, the downstream victim symbol is decoded, and an error signal indicative of the error in the downstream victim symbol is transmitted to the vectoring logic 102, which adaptively updates the set of coefficients 115 from which the crosstalk cancellation signal was derived.

As an example, assume that the vectoring logic 102 receives from the transceiver 72 a downstream symbol of a tone, referred to as the "victim tone" in this example, communicated across the network connection 66. Note that such symbol has been precoded by the vectoring logic 69 (FIG. 4) at the network facility 58 in order to cancel FEXT induced by other downstream tones propagating along other network connections 67 and 68.

In the instant example, for each downstream interfering tone carried by the subscriber lines 39-41, the vectoring logic 102 is configured to calculate a crosstalk contribution indicative of the crossover crosstalk induced by such downstream interfering tone in the symbol of the victim tone. In particular, the vectoring logic 102 receives the precoded symbol of the downstream interfering tone from the CP-side vectoring logic 82 and combines this precoded symbol with the associated coefficient 115 to determine the crosstalk contribution. The vectoring logic 102 similarly determines the respective crosstalk contributions of the other precoded symbols of the downstream interfering tones transmitted from the CP-side transceivers 77-79 and then forms a cancellation signal for the victim tone representing the total amount of crossover crosstalk from the subscriber lines 39-41 affecting the symbol of the victim tone. The vectoring logic 102 transmits such crosstalk cancellation signal to the network-side transceiver 72 that receives the victim tone.

Figure 7:
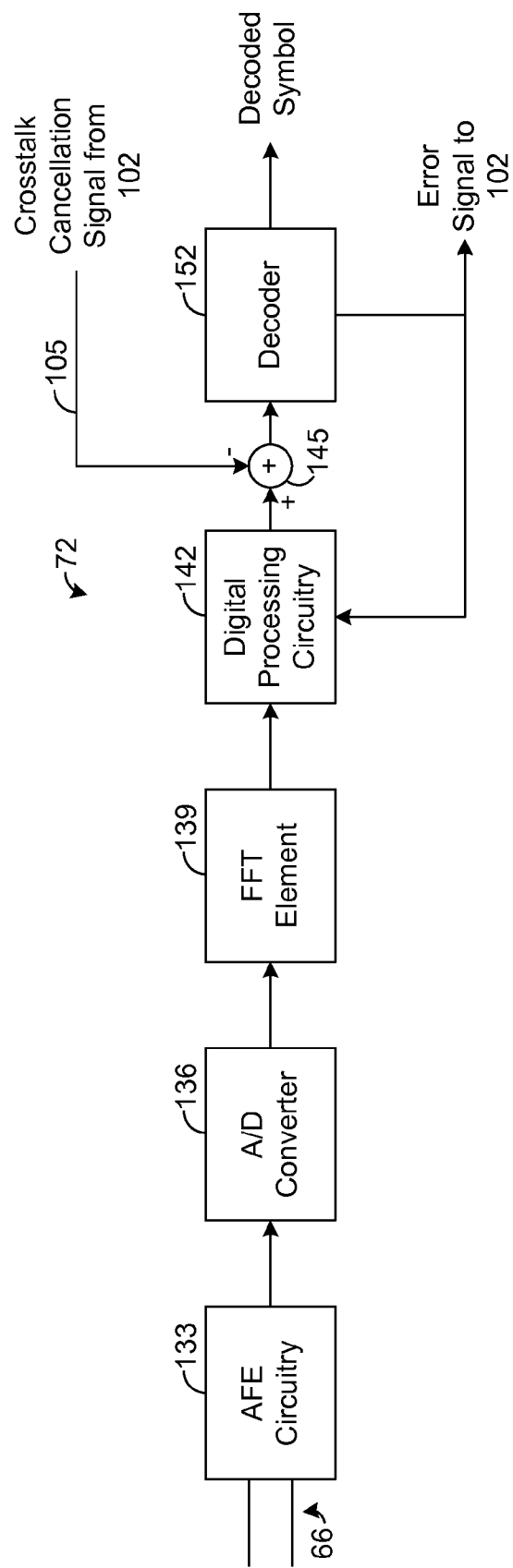
FIG. 7 is a block diagram illustrating an exemplary network-side transceiver, such as is depicted by FIG. 5.

FIG. 7 depicts an exemplary embodiment of components of the network-side transceiver 72 for processing the victim tone. As shown by FIG. 7, the network-side transceiver 72 comprises analog front end (AFE) circuitry 133 that is coupled to the network connection 66, which comprises a twisted-wire pair in one exemplary embodiment. The AFE circuitry 133 shapes and filters the VDSL signal received from the network connection 66 to provide the victim tone. An analog-to-digital (A/D) converter 136 converts the victim tone to digital word representing an encoded digital symbol transmitted from the network transceiver 60 (FIG. 4). Note such symbol has been precoded by the vectoring logic 69 (FIG. 4) at the network facility 58 in order to cancel FEXT that couples from the connections 67 and 68 to the connection 66.

A fast Fourier transform (FFT) element 139 is configured to convert the encoded symbol from the time domain to the frequency domain. Digital processing circuitry 142 is configured to perform various processing operations such as digital filtering and/or equalization to enhance signal quality. The encoded symbol processed by the circuitry 142 is received by a summer 145 that is configured to mathematically combine the value of the crosstalk cancellation signal from the network-side vectoring logic 102 with the encoded symbol of the victim tone. In particular, the summer 145 subtracts the value of the crosstalk cancellation signal from the encoded symbol in order to cancel crossover crosstalk that couples from the subscriber lines 39-41 to the network connection 66.

A decoder 152 receives the encoded symbol of the victim tone from the summer 145 and decodes the symbol to recover the data symbol originally transmitted by the network transceiver 60 (FIG. 4). Further, the decoder 152 provides an error signal that is fed back to the digital processing circuitry 142 for updating filtering and/or equalization coefficients within such circuitry 142 and to the network-side vectoring logic 102 for updating the coefficient set 115 corresponding to the victim tone. Note that the transceiver 72 similarly processes the other tones propagating across the network connections 66-68.

Accordingly, the satellite DSLAM 63 is configured to cancel from the victim tone transmitted across the network connection 66 crossover crosstalk induced by the downstream tones propagating across the subscriber lines 39-41. Similar techniques may be used to cancel crossover crosstalk in the other downstream tones transmitted across the network connections 66-68. Since the downstream symbols transmitted across the network connections 66-68 are precoded by the vectoring logic 69 at the network facility 58 and processed by the DSLAM 63 to remove crossover crosstalk that couples from the subscriber lines 39-41 to the network connections 66-68, the encoded symbols to be decoded by the network-side transceivers 72-74 should be substantially free of crosstalk.

Note that the upstream and downstream channels are preferably frequency division multiplexed according to current VDSL standards. That is, the frequency of the signals transmitted upstream is different than the frequency of the signals transmitted downstream. In one exemplary embodiment, the transceivers 36-38, 60-62, 72-74, and 77-79 are configured to operate synchronously and to keep the tones orthogonal thereby preventing crosstalk bleeding between the frequency bands.

In this regard, the network transceivers 60-62 and the network-side transceivers 72-74 are configured to operate in the synchronous mode defined by current VDSL standards such that they operate synchronously with respect to one another. In addition, the CP transceivers 36-38 and the CP-side transceivers 77-79 are configured to operate in the synchronous mode defined by current VDSL standards such that they operate synchronously with respect to one another. In addition, each CP-side transceiver 77-79 is configured to receive a synchronization signal from at least one of the network-side transceivers 72-74 via at least one connection 121. Based on such synchronization signal, the CP-side transceivers 77-79 control their timing such that they operate synchronously with the network-side transceivers 72-74. Thus, all of the transceivers 36-38, 60-62, 72-74, and 77-79 operate synchronously with respect to one another. Exemplary techniques for controlling the timing of the symbols transmitted by the transceivers 36-38, 60-62, 72-74, and 77-79 in order to help keep the tones orthogonal will be described in more detail hereafter.

In the embodiment described above, the network-side vectoring logic 102 is described as providing crosstalk cancellation signals that are transmitted to the network-side transceivers 72-74, which use such signals to cancel crosstalk from the downstream symbols propagating across the network connections 66-68. However, other configurations are possible. For example, the network-side vectoring logic 102 may be configured to receive such downstream symbols, cancel crosstalk from the downstream symbols, and return the downstream symbols to the network-side transceivers 72-74, similar to how the CP-side vectoring logic 82 processes upstream symbols from the CP-side transceivers 77-79. Further, in other embodiments, the CP-side vectoring logic 82 may be configured to provide crosstalk cancellation signals that are transmitted to the CP-side transceivers 77-79, which cancel crosstalk based on such crosstalk cancellation signals, similar to the crosstalk cancellation signals provided by the network-side vectoring logic 102. Yet other configurations are possible in other embodiments.

It should be noted that the forwarding logic 75 and the vectoring logic 82 and 102 can be implemented in software, hardware, firmware, or any combination thereof. In one exemplary embodiment, the forwarding logic 75 is implemented in hardware, and the vectoring logic 82 and 102 are implemented in software. When any component of the DSLAM 63 is implemented in software or firmware, the DSLAM 63 comprises at least one instruction execution apparatus (not shown), such as a digital signal processor (DSP) or central processing unit (CPU), for executing instructions of the software or firmware. In one exemplary embodiment, the CP-side vectoring logic 82 is packaged in an IC dedicated for the vectoring and crosstalk cancellation operations described herein for the vectoring logic 82, and the sets of coefficients 85 are stored in memory of such IC. Existing off-the-shelf ICs can be used for such vectoring and crosstalk cancellation. However, it should be emphasized that other configurations are possible in other embodiments.

Figure 8:
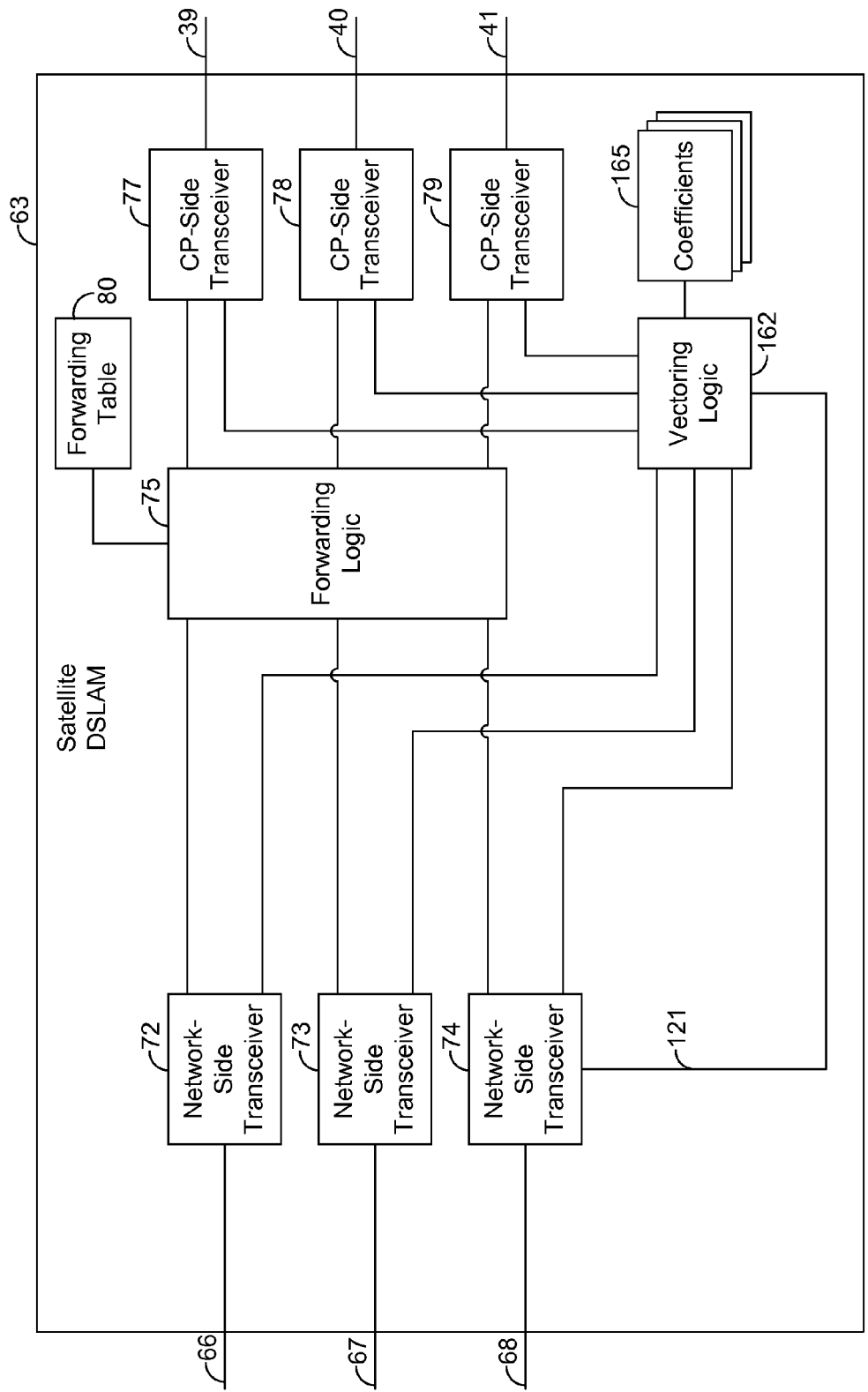
FIG. 8 is a block diagram illustrating an exemplary embodiment of a satellite DSLAM, such as is depicted by FIG. 4.

As an example, FIG. 8 depicts an exemplary embodiment of the DSLAM 63 comprising vectoring logic 162 that is configured to maintain sets of coefficients 165 and to perform the vectoring and crosstalk cancelling operations described above for both the network-side vectoring logic 102 and the CP-side vectoring logic 82. That is, the functionality of both the CP-side vectoring logic 82 and the network-side vectoring logic 102 are incorporated into the vectoring logic 162 of FIG. 8. A conventional vector engine can be modified to define the vectoring logic 162 and, specifically, to provide the added functionality of cancelling crossover crosstalk that couples from the network connections 66-68 to the subscriber lines 39-41 and vice versa.

Figure 9:
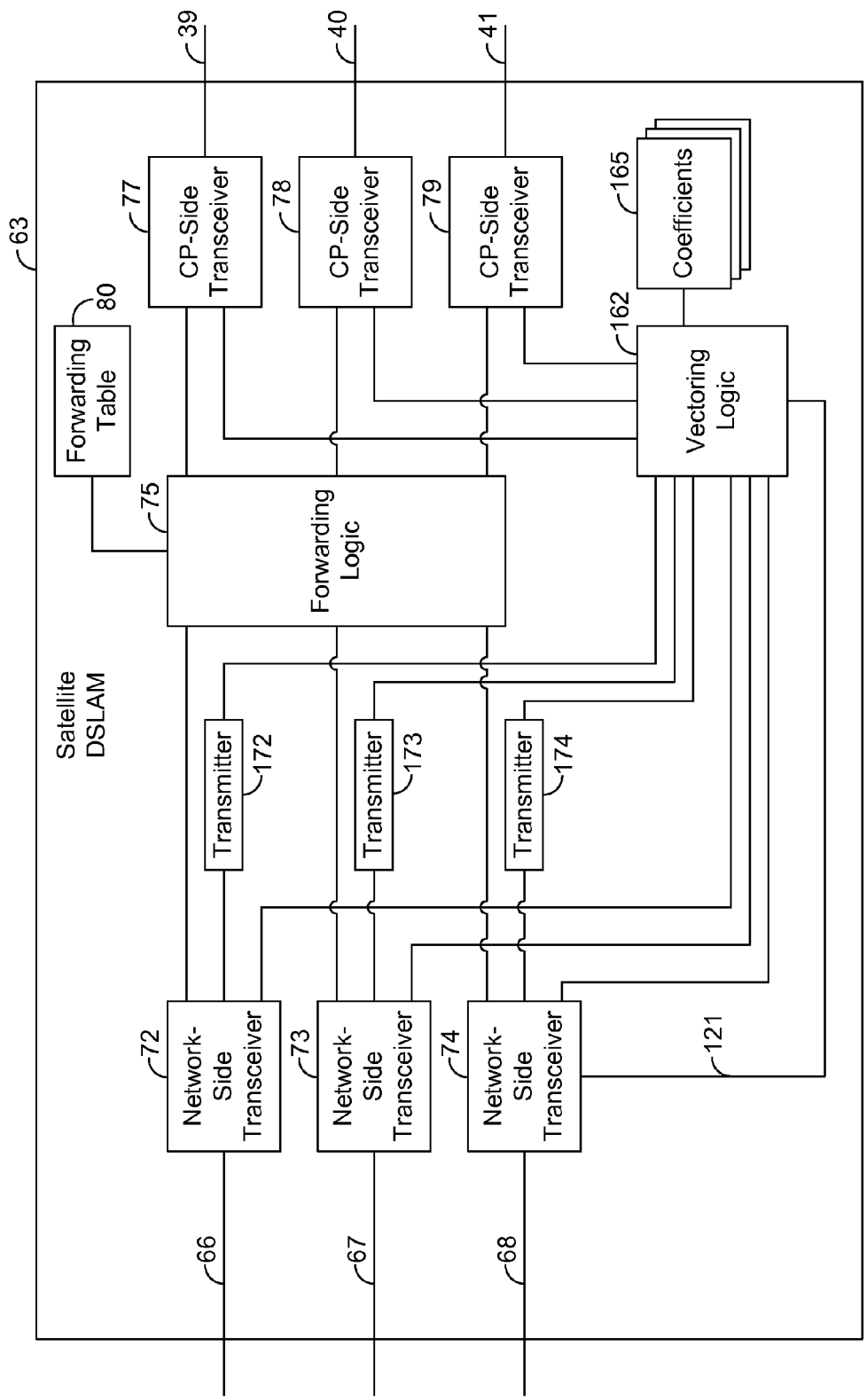
FIG. 9 is a block diagram illustrating an exemplary embodiment of a satellite DSLAM, such as is depicted by FIG. 4.

FIG. 9 shows an exemplary embodiment that is similar to FIG. 8. However, the DSLAM 63 of FIG. 9 comprises a plurality of transmitters 172-174 respectively coupled to the network-side transceivers 72-74 and the vectoring logic 162. The vectoring logic 162 is configured to cancel crosstalk on the CP-side according to the exemplary techniques described above. On the network side, the vectoring logic 162 is configured to form digital crosstalk cancellation signals, as described above. However, rather than transmit such digital crosstalk cancellation signals to the network-side transceivers 72-74 directly, the crosstalk cancellation signals are transferred to the transmitters 172-174. Each such transmitter 172-174 accepts a respective digital crosstalk cancellation signal and modulates an analog carrier signal with the digital data defined by the crosstalk cancellation signal. In one exemplary embodiment, each transmitter 172-174 is a VDSL transmitter similar to the transmitter (not specifically shown) within the respective network-side transceiver 72-74 coupled to it. After modulating analog carrier signals with the digital data defined by the crosstalk cancellation signals, the transmitters 172-174 respectively transmit the modulated signals to the network-side transceivers 72-74, which then combine such modulated signals with the modulated signals received from the network connections 66-68 in order to cancel crosstalk from such received signals.

Figure 10:
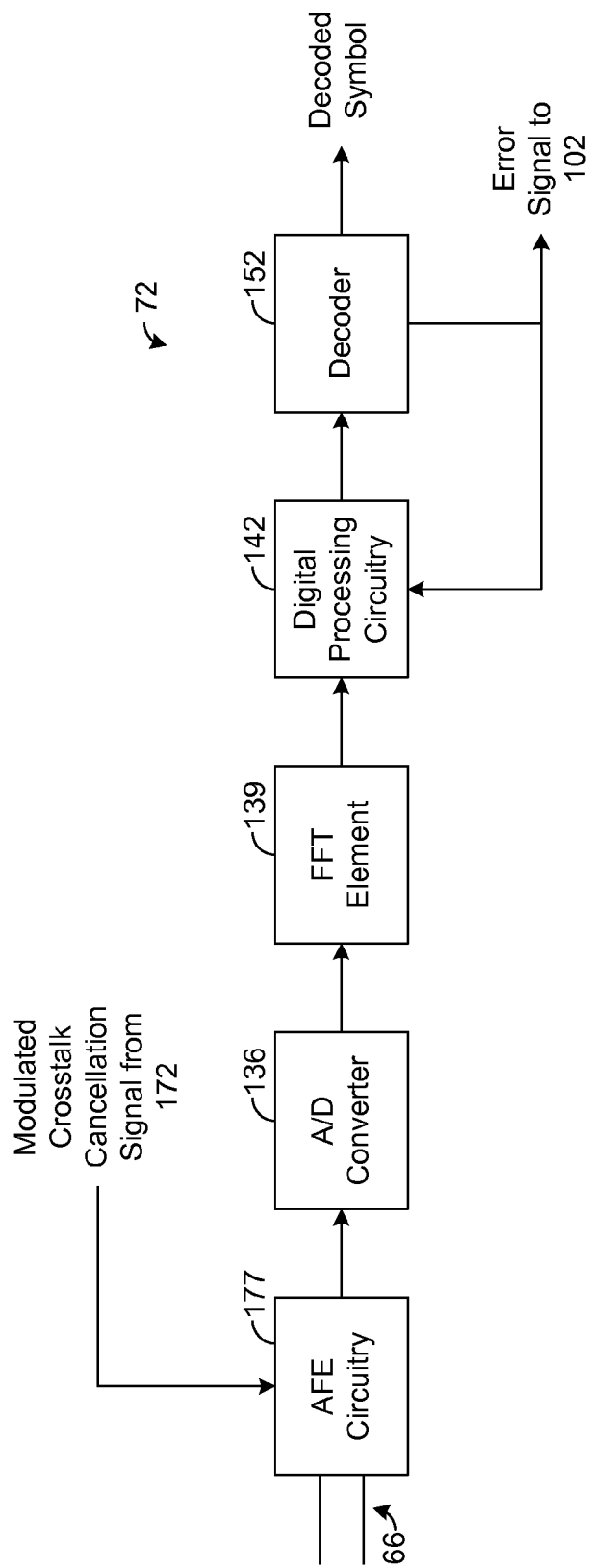
FIG. 10 is a block diagram illustrating an exemplary network-side transceiver, such as is depicted by FIG. 9.

FIG. 10 depicts an exemplary embodiment of a network-side transceiver 72 for the embodiment of FIG. 9. As shown by FIG. 10, the transceiver 72 has AFE circuitry 177 that is coupled to the transmitter 172 and receives from such transmitter 172 a modulated signal carrying the data of the crosstalk cancellation signal received by the transmitter 172 from the vectoring logic 162 (FIG. 9). The AFE circuitry 177 combines such modulated signal with the modulated signal from the network connection 66 carrying the encoded symbol affected by the crosstalk from the network connections 67 and 68, thereby cancelling such crosstalk.

Figure 11:
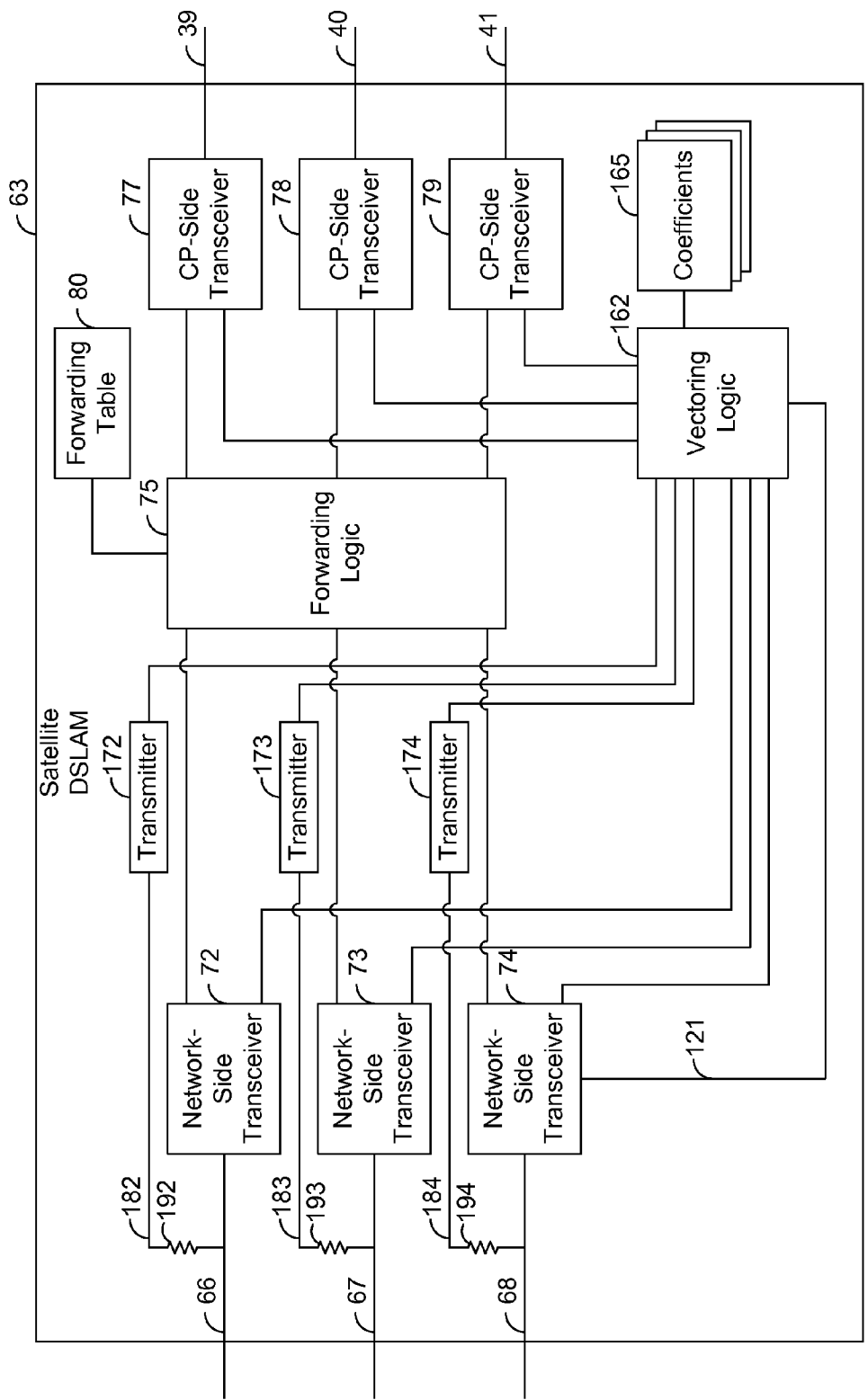
FIG. 11 is a block diagram illustrating an exemplary embodiment of a satellite DSLAM, such as is depicted by FIG. 4.

FIG. 11 depicts an exemplary embodiment of the DSLAM 63 similar to the embodiment shown by FIG. 9. However, in the embodiment depicted by FIG. 11, the transmitters 172-174 are respectively coupled to the network connections 66-68 through resistors 192-194 and connections 182-184, and each connection 182-184 comprises a twisted-wire pair, though it is possible for any of the connections 182-184 to comprise other media, such as an untwisted pair of wires, if desired. In the embodiment shown by FIG. 11, the connections 182-184 are respectively coupled to the network connections 66-68 such that it is unnecessary for the network-side transceivers 72-74 to perform crosstalk cancellation. In this regard, the crosstalk estimated by the crosstalk cancellation signals transferred to the transmitters 172-174 is cancelled by combination of the modulated signals from transmitters 172-174 with the modulated signals propagating across the network connections 66-68 from the network transceivers 60-62 (FIG. 4). Accordingly, conventional VDSL transceivers can be used to implement the network-side transceivers 72-74 without having to reconfigure the conventional VDSL transceivers.

As described above, it is desirable for orthogonaility to be maintained across the tones of the crosstalk sources. Thus, all of the transceivers 36-38, 60-62, 72-74, and 77-79 are synchronized to transmit at the same time. This can be achieved by (1) operating the network transceivers 60-62 and the network-side transceivers 72-74 in the synchronous mode defined by current VDSL standards, (2) operating the CP transceivers 36-38 and the CP-side transceivers 77-79 in the synchronous mode defined by current VDSL standards, and (3) synchronizing the CP-side transceivers 77-79 and the network-side transceivers 72-74 via the synchronization signal carried by the connection 121. In another embodiment, the CP-side transceivers 77-79 can be synchronized with the network-side transceivers 72-74 by operating each of the transceivers 72-74 off of a primary reference clock (PRC) on the network side of the DSLAM 63 and operating the transceivers 77-79 off of a PRC on the CP side of the DSLAM 63.

Figure 12:
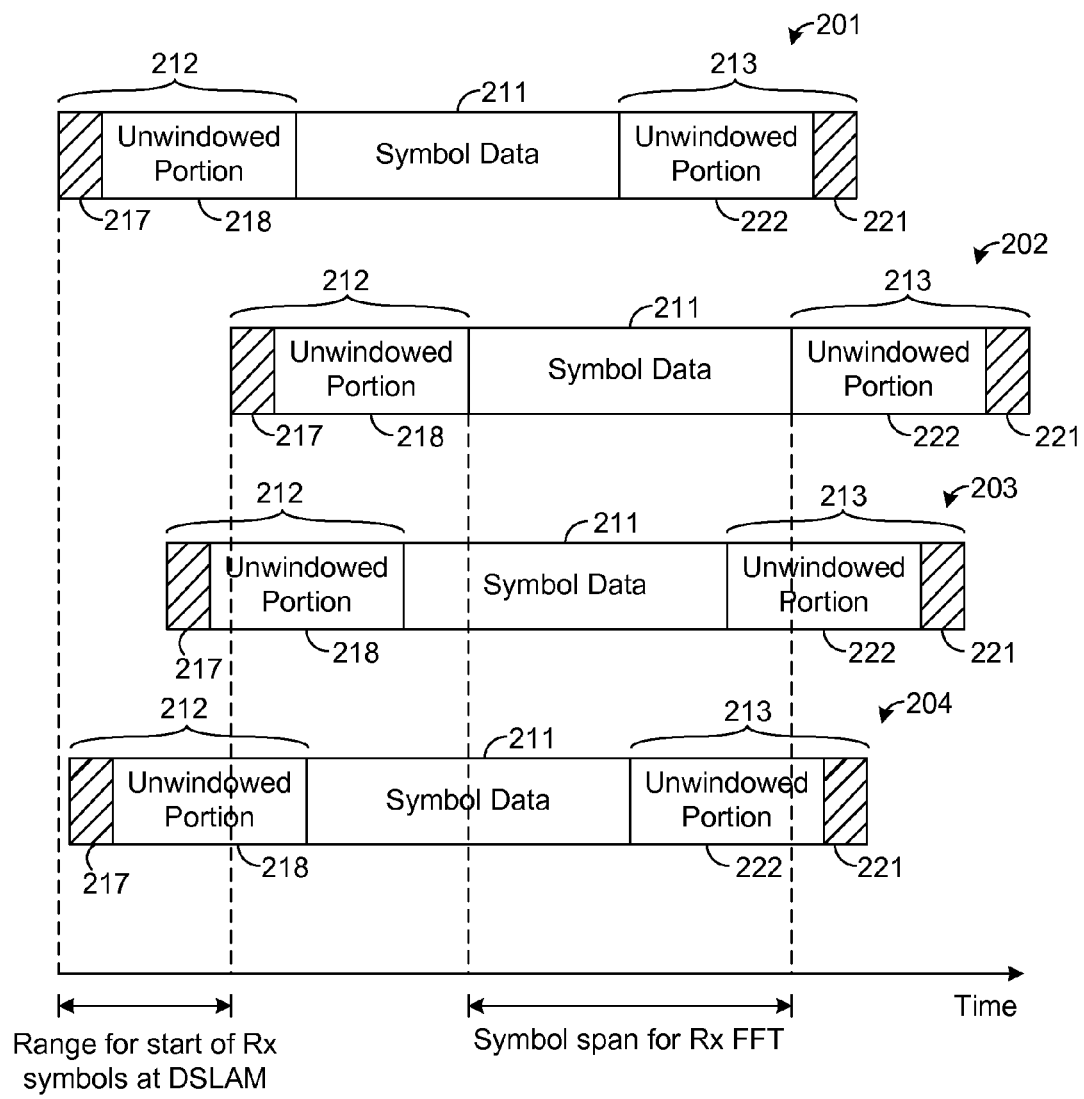
FIG. 12 is a timing chart showing exemplary timing relationships between a plurality of symbols communicated by a system, such as is depicted by FIG. 4.

FIG. 12 depicts timing relationships among a plurality of symbols 201-204 communicated by the DSLAM 63. As described above, all of the transceivers 36-38, 60-62, 72-74, and 77-79 are synchronized, and each transceiver 36-38, 60-62, 72-74, and 77-79 begins to transmit its respective symbol at the same time. The relative positions of symbols 202-204, referred to as "crosstalk symbols," show when they respectively affect the symbol 201. In this regard, the network connections 66-68 and subscriber lines 39-41 have different lengths, and a longer loop generally has a greater delay. For illustrative purposes, assume that the symbol 202 propagates across the longest loop in the system 59 such that it has the greatest offset from the symbol 201. The symbol 203 propagates across a shorter loop such that it has less of an offset from the symbol 201 relative to the symbol 202. Further, the symbol 204 has a relatively small offset such as may be the case when the symbol 204 is transmitted from the DSLAM 63 and induces crossover crosstalk in the symbol 201.

As shown by FIG. 12, each symbol 201-204 has a portion 211, referred to as "symbol data," defining the symbol being communicated. A copy of a portion at the end of the symbol data 211 is positioned at the beginning of the symbol and is referred to as the "cyclic prefix." A copy of a portion at the beginning of the symbol data 211 is positioned at the end of the symbol and is referred to as the "cyclic suffix." The cyclic prefix 212 has a windowed portion 217, which is reshaped by the transceivers at the beginning of the symbol, and an unwindowed portion 218. Similarly, the cyclic suffix 213 has a windowed portion 221, which is reshaped by the transceivers at the end of the symbol, and an unwindowed portion 222. The cyclic prefix 212 is not usable due to interference that may result from a preceding symbol. However, in the cyclic suffix 213, the unwindowed portion 222 comprises redundant data from the symbol data 211 and can be used to recover the full symbol data 211.

The length of the unwindowed portion 222 in the cyclic suffix 213 is selected to be such that a time of transmission of such unwindowed portion 222 is at least as long as the longest delay in any of the network connections 66-68 or the subscriber lines 39-41. The interval marked "Symbol Span for Rx FFT" specifies one candidate receiver FFT symbol span that could be used for receiving symbols on both sides of the DSLAM 63. Because of the presence of the cyclic suffix 213, using this interval ensures that there are no symbol boundary problems for any received symbol or for any crosstalk symbol within this span. Therefore, the orthogonality that is desirable to tone-by-tone cancellation is preserved by the described timing arrangement. Another option would be for all of the transceivers on a given side (e.g., either network side or CP side) of the DSLAM 63 to us a receiver FFT symbol span that corresponds to the original symbol data for the longest loop connected to that side of the DSLAM 63. Any contiguous sample set contained within the span of the original symbol and the unwindowed portion 222 of the cyclic suffix 213 is acceptable for demodulation and for maintaining orthogonality. In this range, a complex frequency domain equalizer in the receive signal path and the associated crosstalk cancellation coefficient set can compensate for any time shift.

Figure 13:
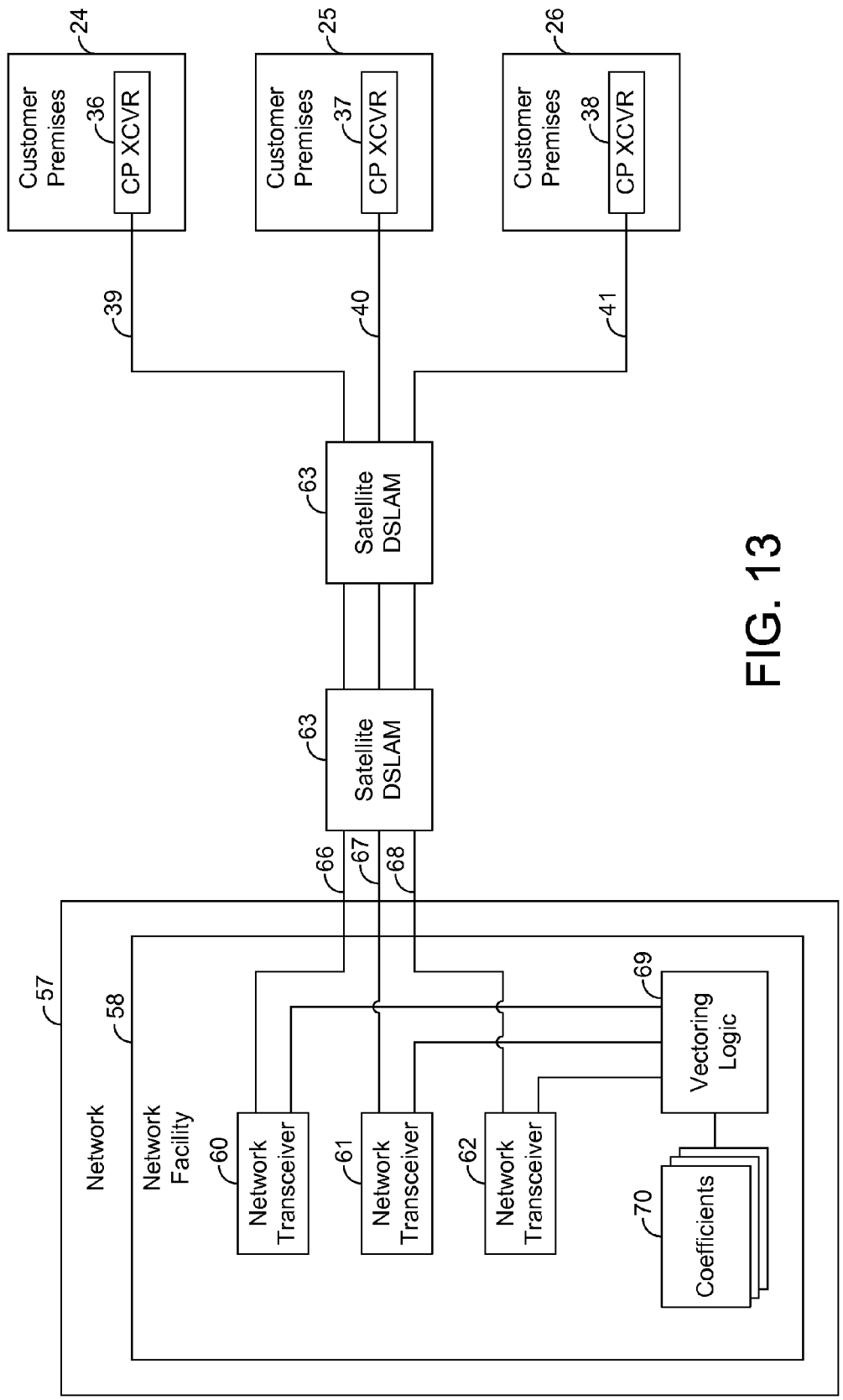
FIG. 13 is a block diagram illustrating an exemplary embodiment of a communication system using a plurality of daisy-chained satellite DSLAMs between a network and a plurality of customer premises.

Note that it is possible to use the configurations of the DSLAM 63 described above to daisy-chain a plurality of DSLAMs 63, as shown by FIG. 13, such that each DSLAM 63 serves as a repeater for regenerating signals propagating to or from the customer premises 24-26. Any number of DSLAMs 63 may be daisy-chained as shown. Further, the timing scheme describe above is extensible to such an embodiment where there are any number of DSLAMs 63 daisy-chained together. To support such a chain, it is desirable for the length of the unwindowed portion 222 in the cyclic suffix 213 of the communicated symbols to be selected to be at least as long as the longest delay in any of the links within the daisy-chain.

Figure 14:
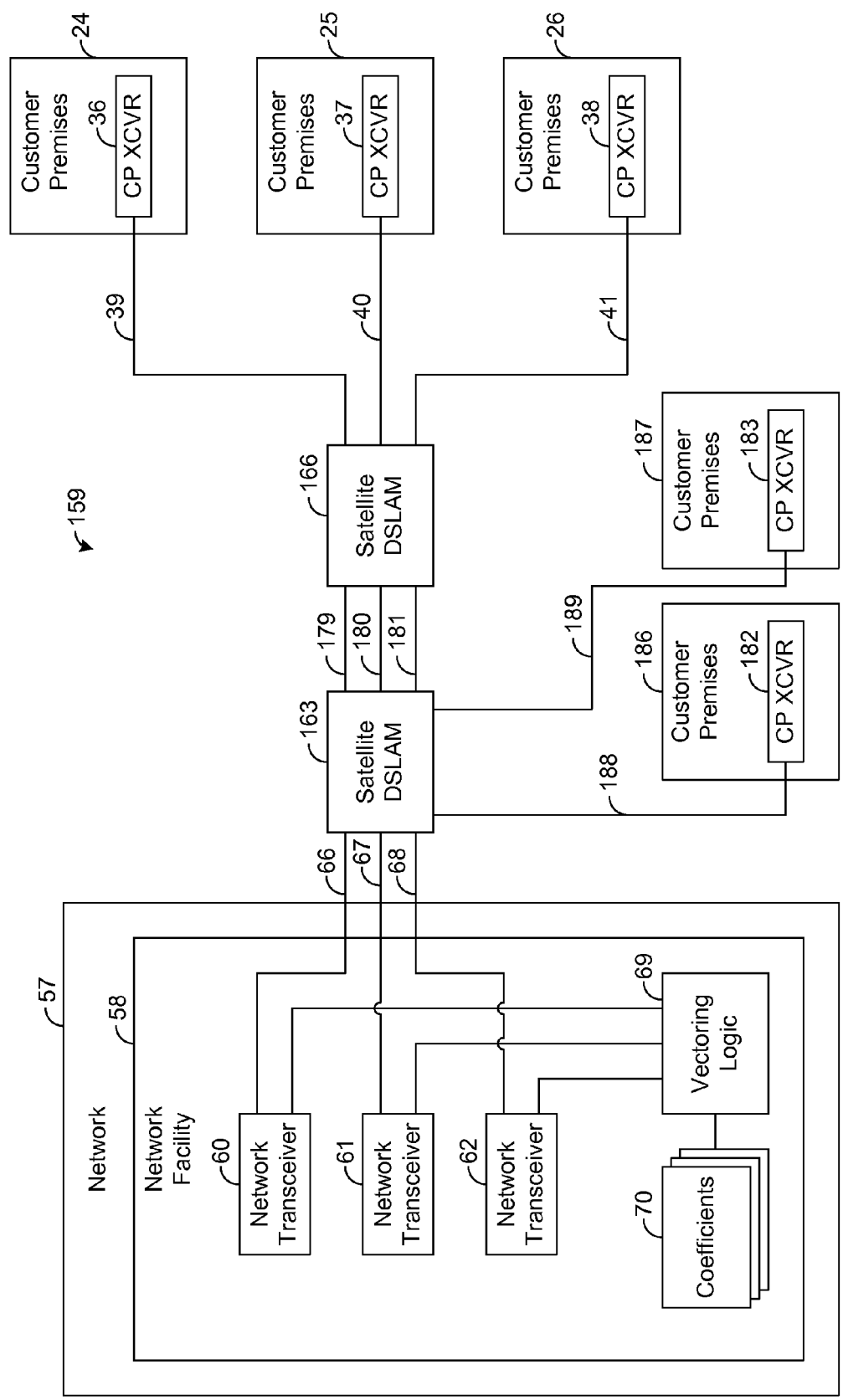
FIG. 14 is a block diagram illustrating an exemplary embodiment of a communication system using a plurality of daisy-chained satellite DSLAMs between a network and a plurality of customer premises.

FIG. 14 depicts an exemplary embodiment of a communication system 159 similar to the embodiment shown by FIG. 13. In this regard, the system 159 comprises a plurality of daisy-chained satellite DSLAMs 163 and 166, which are coupled to one another via a plurality of subscriber lines 179-181. The satellite DSLAM 163 is also coupled to CP transceivers 182 and 183 residing at customer premises 186 and 87 via subscriber lines 188 and 189, respectively. In such an embodiment, the number of CP-side transceivers at the satellite DSLAM 163 is greater than the number of network-side transceivers at the satellite DSLAM 163. In particular, in the exemplary embodiment shown by FIG. 14, there are five CP-side transceivers for servicing the subscriber lines 179-181, 188, and 189, respectively, and there are three network-side transceivers for servicing the subscriber lines 66-68, respectively.

In such an embodiment, crosstalk (including both FEXT and crossover crosstalk) is canceled according to the techniques described above for the exemplary embodiment depicted by FIG. 5. However, the number of "a" coefficients, which are associated with tones transmitted across the subscriber lines 179-181, 188, and 189, for a given victim tone is greater than the number of "b" coefficients, which are associated with tones transmitted across the network connections 66-68. As described above, the "b" coefficients may be stored in separate matrices and applied separately to the victim tones relative to the "a" coefficients, if desired.

Now, therefore, the following is claimed:

1. A satellite access device positioned at an intermediate point between a network and at least one customer premises, comprising:
   a network-side transceiver coupled to a first conductive connection and configured to receive from the first conductive connection a signal carrying data transmitted from the network;
   a customer premises (CP)-side transceiver coupled to a second conductive connection and configured to transmit a signal across the second conductive connection toward the customer premises; and
   vectoring logic configured to associate crosstalk cancellation coefficients with tones carried by at least one of the signals, the vectoring logic further configured to cancel crosstalk that couples between the first conductive connection and the second conductive connection based on associations of the tones with the crosstalk cancellation coefficients, wherein the vectoring logic is configured to receive a first symbol from the network-side transceiver and a second symbol from the CP-side transceiver, wherein the vectoring logic is configured to associate the second symbol with one of the crosstalk cancellation coefficients to form a crosstalk cancellation signal to be combined with the first symbol for cancelling at least a portion of the crosstalk.

2. The device of claim 1, wherein the signal received by the network-side transceiver is a very-high-bit-rate digital subscriber line (VDSL) signal, and wherein the signal transmitted by the CP-side transceiver is a VDSL signal.

3. The device of claim 1, wherein the network-side transceiver is synchronous to the CP-side transceiver, wherein the network-side transceiver operates in a synchronous mode with a transceiver coupled to the first conductive connection, and wherein the CP-side transceiver operates in a synchronous mode with a transceiver coupled to the second conductive connection.

4. The device of claim 1, wherein the vectoring logic is configured to transmit the crosstalk cancellation signal to the network-side transceiver.

5. The device of claim 1, wherein the vectoring logic comprises network-side vectoring logic and CP-side vectoring logic, the network-side vectoring logic configured to cancel crosstalk from a tone received by the network-side transceiver, the CP-side vectoring logic configured to cancel crosstalk from a tone received by the CP-side vectoring logic, wherein the CP-side vectoring logic is implemented in an integrated circuit separate from the network-side vectoring logic.

6. The device of claim 1, wherein each symbol transmitted by the network-side transceiver and the CP-side transceiver has symbol data, a cyclic prefix, and a cyclic suffix.

7. The device of claim 6, wherein the cyclic suffix has an unwindowed portion having a length that is selected such that a time of transmission for the unwindowed portion is at least as long as the delay for transmitting across a conductive connection between the network and the at least one customer premises.

8. A communication system, comprising:
a first plurality of conductive connections;
a second plurality of conductive connections; and
a satellite network access device having a plurality of network-side transceivers and a plurality of customer premises (CP)-side transceivers, the network-side transceivers coupled to the first plurality of conductive connections and the CP-side transceivers coupled to the second plurality of conductive connections, wherein the first plurality of conductive connections extend between the satellite network access device and a network, wherein the second plurality of conductive connections extend between the satellite network access device and at least one customer premises, wherein the satellite network access device has first vectoring logic configured to maintain first crosstalk cancellation coefficients, wherein the first vectoring logic is configured to precode, based on associations of a portion of the first crosstalk cancellation coefficients with symbols transmitted by the network-side transceivers across the first plurality of conductive connections and with symbols transmitted by the CP-side transceivers across the second plurality of conductive connections such that crosstalk that couples between the second plurality of conductive connections and crosstalk that couples from the first plurality of conductive connections to the second plurality of conductive connections are cancelled, wherein the first vectoring logic is configured to cancel crosstalk that couples between the second plurality of conductive connections based on associations of a portion of the first crosstalk cancellation coefficients with symbols received by the CP-side transceivers from the second plurality of conductive connections, and wherein the first vectoring logic is configured to cancel from symbols received by the network-side transceivers from the first plurality of conductive connections crosstalk that couples from the second plurality of conductive connections to the first plurality of conductive connections based on associations of a portion of the first crosstalk cancellation coefficients with symbols transmitted by the CP-side transceivers across the second plurality of conductive connections, and wherein the first vectoring logic is configured to associate at least one of the symbols transmitted by the CP-side transceivers with at least one crosstalk cancellation coefficient to form a cancellation signal and to cancel at least a portion of the crosstalk that couples from the second plurality of conductive connections to the first plurality of conductive connections based on the cancellation signal.

9. The system of claim 8, further comprising a plurality of CP transceivers, each of the CP transceivers coupled to a respective one of the CP-side transceivers via a respective one of the second plurality of conductive connections.

10. The system of claim 8, further comprising a plurality of network transceivers, each of the network transceivers coupled to a respective one of the network-side transceivers via a respective one of the first plurality of conductive connections.

11. A communication system, comprising:
a first plurality of conductive connections;
a second plurality of conductive connections;
a satellite network access device having a plurality of network-side transceivers and a plurality of customer premises (CP)-side transceivers, the network-side transceivers coupled to the first plurality of conductive connections and the CP-side transceivers coupled to the second plurality of conductive connections, wherein the first plurality of conductive connections extend between the satellite network access device and a network, wherein the second plurality of conductive connections extend between the satellite network access device and at least one customer premises, wherein the satellite network access device has first vectoring logic configured to maintain first crosstalk cancellation coefficients, wherein the first vectoring logic is configured to precode, based on associations of a portion of the first crosstalk cancellation coefficients with symbols transmitted by the network-side transceivers across the first plurality of conductive connections and with symbols transmitted by the CP-side transceivers across the second plurality of conductive connections such that crosstalk that couples between the second plurality of conductive connections and crosstalk that couples from the first plurality of conductive connections to the second plurality of conductive connections are cancelled, wherein the first vectoring logic is configured to cancel crosstalk that couples between the second plurality of conductive connections based on associations of a portion of the first crosstalk cancellation coefficients with symbols received by the CP-side transceivers from the second plurality of conductive connections, and wherein the first vectoring logic is configured to cancel from symbols received by the network-side transceivers from the first plurality of conductive connections crosstalk that couples from the second plurality of conductive connections to the first plurality of conductive connections based on associations of a portion of the first crosstalk cancellation coefficients with symbols transmitted by the CP-side transceivers across the second plurality of conductive connections;
a plurality of network transceivers, each of the network transceivers coupled to a respective one of the network-side transceivers via a respective one of the first plurality of conductive connections;
a plurality of network transceivers, each of the network transceivers coupled to a respective one of the network-side transceivers via a respective one of the first plurality of conductive connections; and
second vectoring logic coupled to the plurality of network transceivers and configured to maintain second crosstalk cancellation coefficients, wherein the second vectoring logic is configured to precode, based on associations of a portion of the second crosstalk cancellation coefficients with symbols transmitted by the network transceivers across the first plurality of conductive connections, symbols transmitted by the network transceivers across the first plurality of conductive connections such that crosstalk that couples between the first plurality of conductive connections is cancelled, and wherein the second vectoring logic is configured to cancel crosstalk that couples between the first plurality of conductive connections based on associations of a portion of the second crosstalk cancellation coefficients with symbols received by the network transceivers from the first plurality of conductive connections.

12. A method for use in a satellite access device positioned at an intermediate point between a network and at least one customer premises, comprising the steps of:
- receiving, via a first conductive connection coupled to the satellite access device, a signal carrying data transmitted from the network;
- transmitting a signal across a second conductive connection toward the customer premises, the second conductive connection coupled to the satellite access device;
- associating crosstalk cancellation coefficients with tones carried by at least one of the signals, wherein the associating step comprises the step of associating at least one of the crosstalk cancellation coefficients with at least one symbol carried by the signal transmitted across the second conductive connection thereby forming a cancellation signal; and
- cancelling crosstalk that couples between the first conductive connection and the second conductive connection based on the associating step, wherein the cancelling step comprises the step of combining the cancellation signal with at least one symbol carried by the signal received via the first conductive connection.

* * * * *